United States Patent
Kumada et al.

(10) Patent No.: US 6,919,972 B2
(45) Date of Patent: Jul. 19, 2005

(54) IMAGE PROCESSING APPARATUS AND ITS CONTROL METHOD, AND IMAGE PROCESSING METHOD

(75) Inventors: Shuichi Kumada, Kanagawa (JP); Yasushi Nakajima, Kanagawa (JP); Kenichi Naito, Tokyo (JP); Hayato Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 848 days.

(21) Appl. No.: 09/950,867

(22) Filed: Sep. 12, 2001

(65) Prior Publication Data
US 2002/0051002 A1 May 2, 2002

(30) Foreign Application Priority Data
Sep. 12, 2000 (JP) .......................... 2000-277166

(51) Int. Cl.[7] .......................... G06K 15/00; G06T 5/00; H04N 1/407; H04N 1/409; H04N 1/387

(52) U.S. Cl. .......................... 358/1.9; 358/504; 382/162

(58) Field of Search .................. 358/1.9, 504; 382/162; 345/600–602, 604

(56) References Cited

U.S. PATENT DOCUMENTS 5,978,506 A * 11/1999 Murayama et al. ......... 382/162
6,278,477 B1 * 8/2001 Ohba .......................... 347/251

FOREIGN PATENT DOCUMENTS

JP 9-186900 7/1997
JP 2001-094796 4/2001

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto

(57) ABSTRACT

Upon reading an A3-size sample image, a colorimeter that can read A3 size can be used but such A3-size calorimeter is expensive. For this reason, an A3-size recording paper sheet is cut into halves, i.e., two A4-size sample images, which are measured by an A4-size calorimeter. To prevent such troublesome operation, color patches are divided into nearly half groups, and these color patch groups are printed on an A3-size recording paper sheet to have their top positions on the opposite sides. In this way, after one color patch group is measured, the sample image is rotated through 180° and is set on the calorimeter to measure the other color patch group.

12 Claims, 23 Drawing Sheets

FIG. 2

| R | G | B | L | a | b |
|---|---|---|---|---|---|
| 0 | 0 | 0 | 0 | 0 | 0 |
| 0 | 0 | 16 | 12 | -1 | -10 |
| ⋮ | ⋮ | ⋮ | ⋮ | ⋮ | ⋮ |
| 255 | 255 | 255 | 100 | 0 | 0 |

$Lab_1' - Lab_1 = a$ $Lab_2 - Lab_1' = b$ $Lab_1' = \frac{b}{a+b} CMYK_1 + \frac{a}{a+b} CMYK_2$

IMAGE PROCESSING APPARATUS AND ITS CONTROL METHOD, AND IMAGE PROCESSING METHOD

FIELD OF THE INVENTION

The present invention relates to an image processing apparatus and its control method, and an image processing method and, for example, to a color reproduction process of a printer.

BACKGROUND OF THE INVENTION

As a color correction scheme for improving the color reproduction effect in a color reproduction process of a printer and printing press, a method of converting data of an input color space into data of an output color space by a color masking method that obtains data of the output color space via matrix operations of data of the input color space and a lookup table (LUT) called a profile is prevalently used.

However, the output characteristics of a color printer and printing press show strong nonlinearity. Therefore, a global method such as a color masking method, i.e., a color correction method in which a change in matrix element influences the entire output color space, cannot sufficiently approximate the characteristics of the color printer and printing press in all color ranges. Even when a profile is provided, its table is often obtained by the color masking method, and color reproduction remains difficult.

To solve this problem, a method for providing a profile which can precisely approximate strong nonlinear output characteristics of a color printer and printing press, and allows precise color reproduction has been proposed.

Upon generating a profile, the colors of color patches of a sample image printed by a color printer or printing press are measured by a calorimeter. Upon colorimetry, calibration is periodically done to suppress colorimetric errors.

SUMMARY OF THE INVENTION

It is an object of the present invention to attain efficient colorimetry for providing a profile.

In order to achieve the above object, a preferred embodiment of the present invention discloses an image processing method comprising the steps of: sending color patch data to an output device to control the output device to record color patches, wherein when the output device can record color patches on a recording paper sheet of a size not less than twice a recording paper sheet size that a colorimetry device can measure, the output device records two color patch groups each having the recording paper sheet size that the colorimetry device can measure; controlling the colorimetry device to read the two color patch groups; and generating a profile of the output device on the basis of colorimetric results of the two color patch groups, wherein read start positions of the two color patch groups are symmetrically arranged about a given point.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows an example of an RGB to Lab conversion table;

DESCRIPTION OF THE PREFERRED EMBODIMENTS

An image processing apparatus according to an embodiment of the present invention will be described hereinafter with reference to the accompanying drawings.

First Embodiment

[Arrangement]

Figure 1:
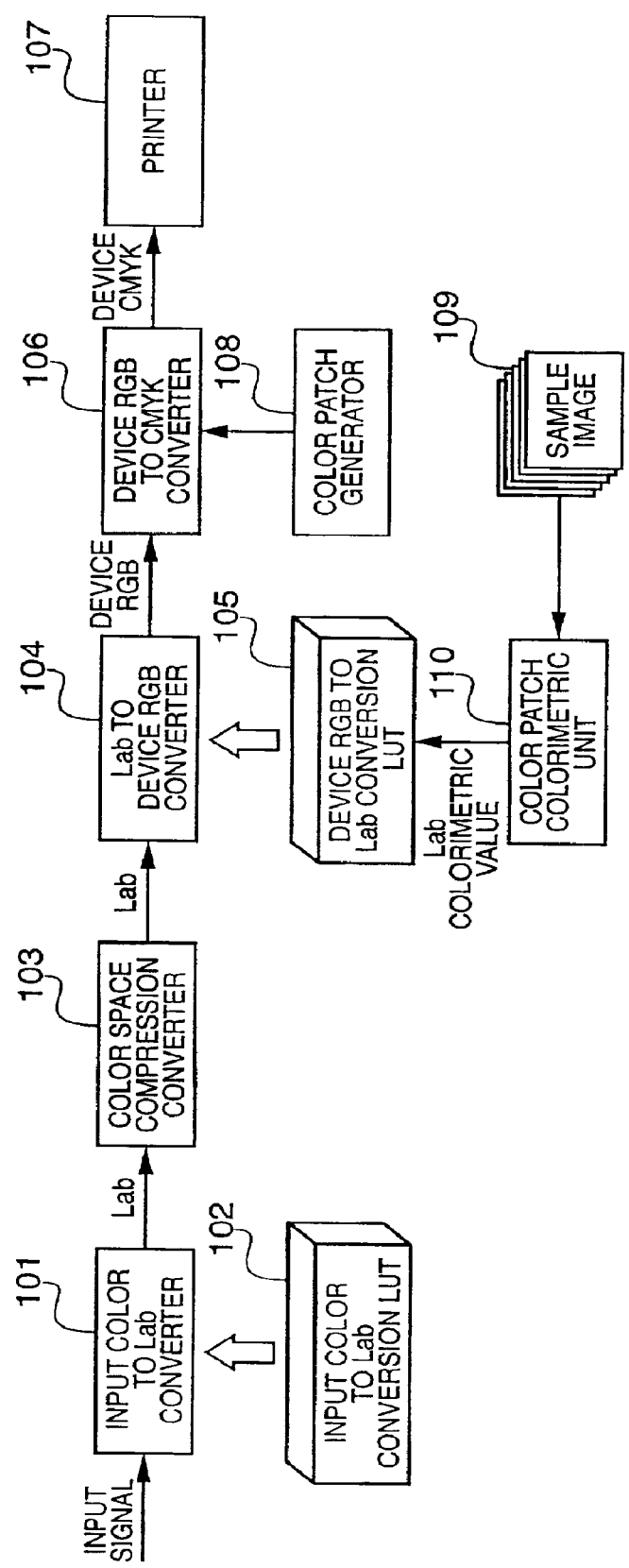
FIG. 1 is a block diagram showing the arrangement of an image processing apparatus of the first embodiment.

FIG. 1 is a block diagram showing the arrangement of an image processing apparatus of this embodiment.

A signal input to the image processing apparatus shown in FIG. 1 is an image signal of a color space depending on a given device, and may be an RGB signal which represents an image read from a document by a given scanner or a CMYK signal to be output to a given printer. When the first embodiment is applied to a copying machine, an input signal is an RGB signal that represents an image read by a scanner. When this embodiment is applied to proof (test print, calibration print), the input signal is a CMYK signal to be output to a printing press as a target.

Such input signal is input to an input color to Lab converter 101, and is converted into a signal of an Lab color space as a device-independent color space. This conversion is implemented by LUT conversion using an input color to Lab conversion LUT 102.

In the input color to Lab conversion LUT 102, a table corresponding to the color space of an input signal must be set. For example, when an image signal that depends on the RGB color space of scanner A is input, a three-dimensional input—three-dimensional output RGB to Lab conversion table that represents the correspondence between RGB values depending on the RGB color space of scanner A and Lab values is set as a table of the input color to Lab conversion LUT 102. Likewise, when an image signal depending on the CMYK color space of printer B is input, a four-dimensional input—three-dimensional output CMYK to Lab conversion table that represents the correspondence between CMYK values depending on the color space of printer B, and Lab values is set as a table of the input color to Lab conversion LUT 102.

Figure 2:
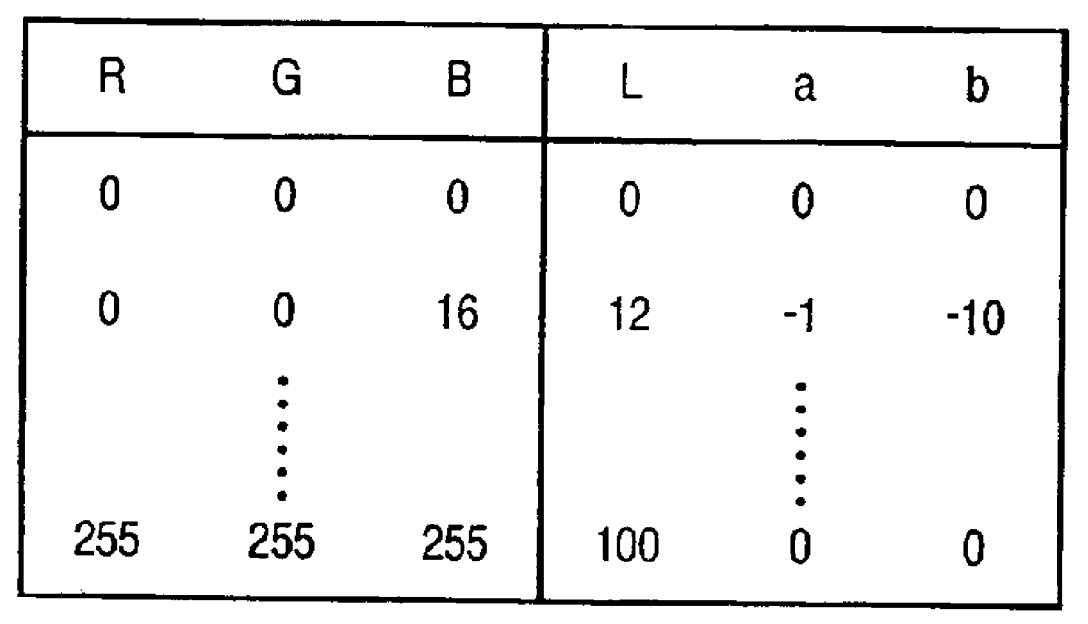

FIG. 2 shows an example of the RGB to Lab conversion table, and shows the correspondence between 8-bit RGB values and Lab values. Since an actual table stores Lab values having representative RGB values as addresses, the input color to Lab converter 101 reads out Lab values near input RGB values from the table, and acquires Lab values corresponding to the input RGB values by interpolating using the readout Lab values.

An Lab signal output from the input color to Lab converter 101 is converted into a signal in a device RGB color space by an Lab to device RGB converter 104 on the basis of a device RGB to Lab conversion LUT 105. This process will be described in detail later.

When the color space of an input signal is an RGB color space, its color range is often broader than the color reproduction range of a printer. For this reason, the Lab signal output from the input color to Lab converter 101 is mapped in a color reproduction range of a printer 107 (by gamut mapping) by a color space compression converter 103, and is then input to the Lab to device RGB converter 104. As a practical method of gamut mapping, a method of performing a color space compression process in a uniform color space disclosed in Japanese Patent Laid-Open No. 8-130655, or the like may be used.

A signal of the device RGB color space, which is output from the Lab to device RGB converter 104 is converted into a signal of a CMYK color space depending on the printer 107 by a device RGB to CMYK converter 106, and the converted signal is sent to the printer 107. As for RGB to CMYK conversion, various methods are available, and a method to be used is not particularly limited. For example, the following conversion equations are used:

$C=(1.0-R)-K$ $M=(1.0-G)-K$ $Y=(1.0-B)-K$ $K=\min\{(1.0-R), (1.0-G), (1.0-B)\}$

[Lab to Device RGB Conversion]

The Lab to device RGB converter 104 will be described in detail below.

Figure 3:
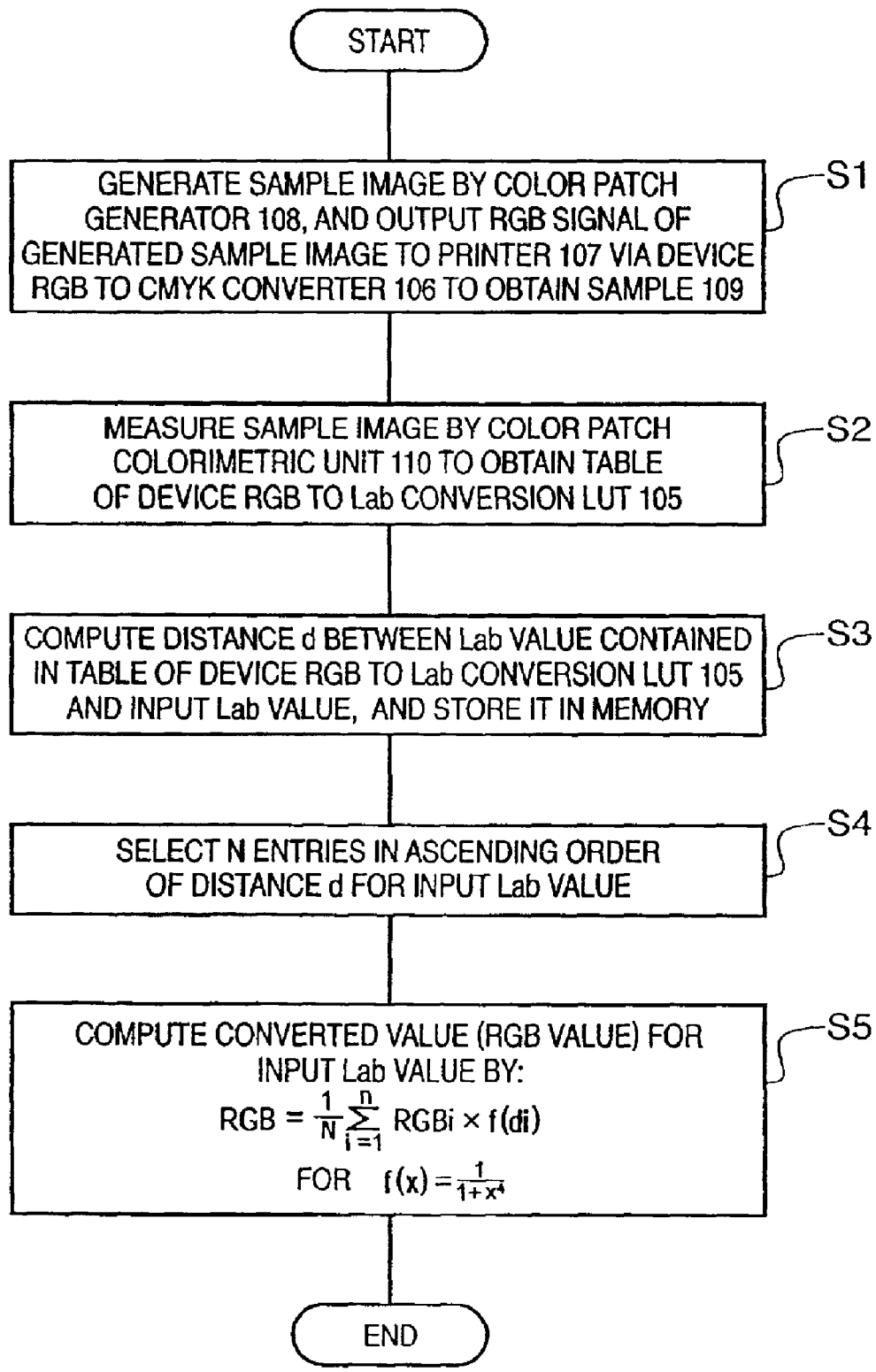
FIG. 3 is a flow chart showing the sequence for executing Lab to device RGB conversion by obtaining the correspondence between device RGB values and Lab colorimetric values.

The Lab to device RGB converter 104 converts a signal on the basis of the correspondence between device RGB values obtained in advance, and Lab colorimetric values. FIG. 3 is a flow chart showing the sequence for executing Lab to device RGB conversion by obtaining the correspondence between device RGB values and Lab colorimetric values. Of course, when the correspondence between device RGB values and Lab colorimetric values are already obtained, steps S1 and S2 are skipped.

Step S1

Figure 4:
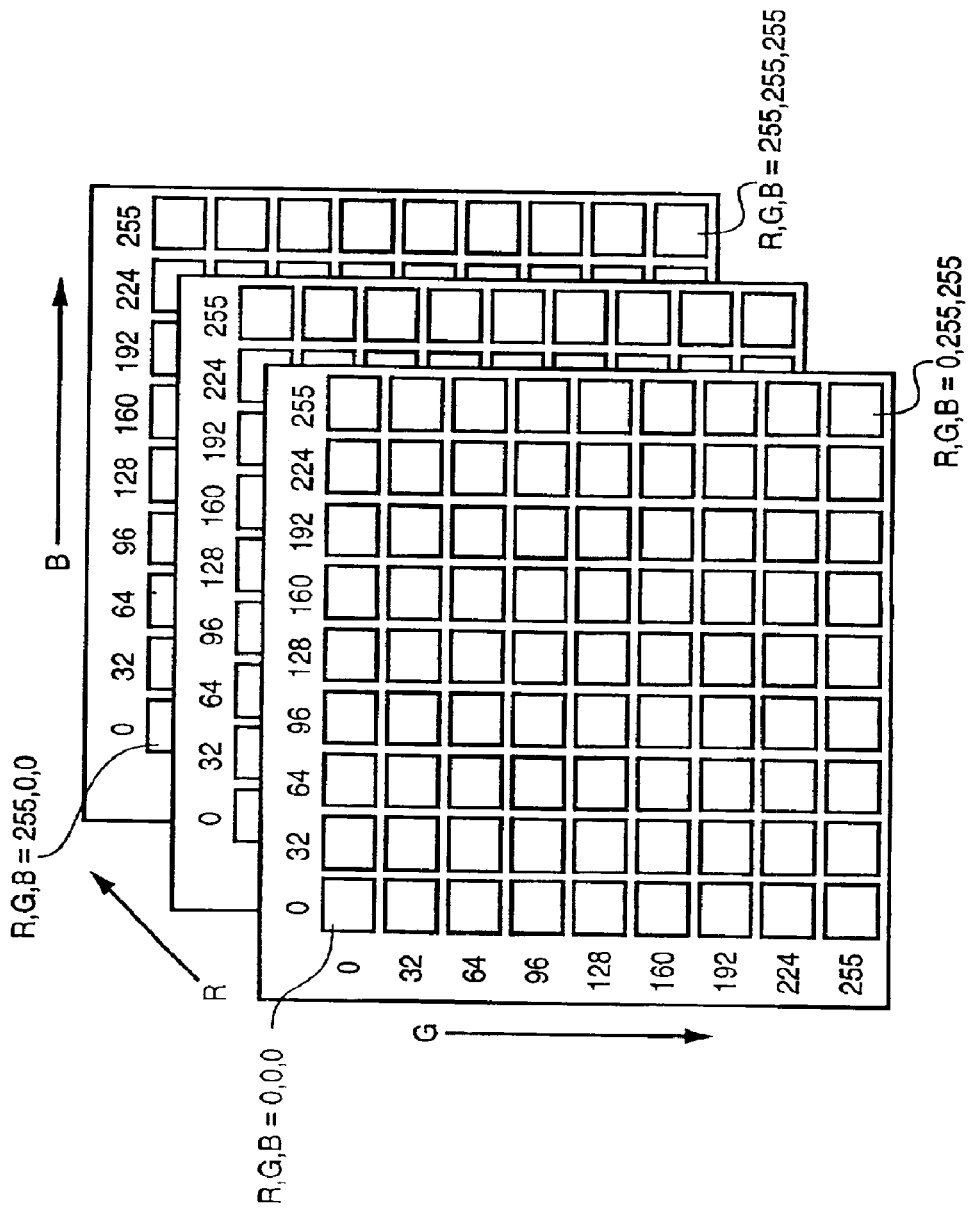
FIG. 4 shows an example of a sample image.

A color patch generator 108 generates a sample image consisting of a plurality of color patches, as shown in FIG. 4. An RGB signal of the generated sample image is output to the printer 107 via the device RGB to CMYK converter 106 to obtain a sample image 109.

The sample image is generated by the color patch generator 108 to uniformly divide the device RGB color space. In the example shown in FIG. 4, an RGB color space specified by 8 bits per each of R, G, and B is uniformly divided into 9×9×9 to obtain 729 patches. Normally, a color space depending on the printer 107 is a CMYK color space. However, since the RGB color space can be converted into a CMYK color space by a conversion rule, the RGB color space is considered as a color space which depends on the printer 107.

Step S2

Figure 5:
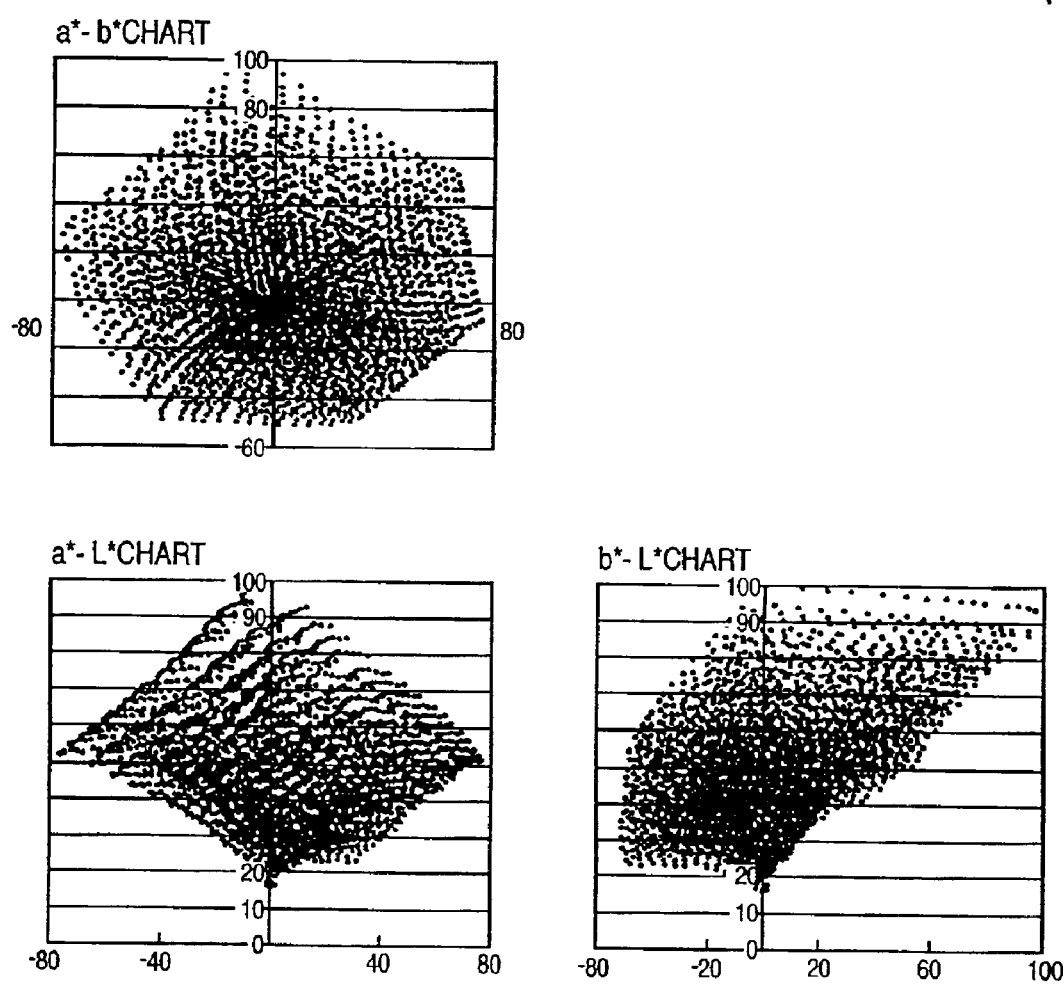
FIG. 5 shows an example of the colorimetric results of a color patch colorimetric unit.

Color patches of the sample image 109 are measured by a color patch colorimetric unit 110 to obtain Lab colorimetric values of the respective color patches. The obtained Lab colorimetric values are distributed on an Lab color space, as shown in FIG. 5. With this operation, RGB values generated by the color patch generator 108 and Lab colorimetric values measured by the color patch colorimetric unit 110 are obtained, thus obtaining a table of the device RGB to Lab conversion LUT 105. Using this device RGB to Lab conversion LUT 105, Lab to device RGB conversion is done.

When an LUT is used, known interpolation operations such as cube interpolation, tetrahedron interpolation, and the like are used. In these interpolation operations, grids corresponding to the input side of the LUT must have an equal interval. The device RGB values in the table of the device RGB to Lab conversion LUT 105 are equally spaced apart, but Lab colorimetric values are not. For this reason, when Lab values are input, the table of the device RGB to Lab conversion LUT 105 does not form an LUT having grids at an equal interval. Therefore, an interpolation operation that inputs Lab values cannot be simply made. For this reason, Lab to device RGB conversion is done in the following sequence.

Step S3

Distances d (equivalent to color differences obtained by Lab color difference equations) between Lab values included in the table of the device RGB to Lab conversion LUT 105, and the input Lab value are computed and are stored in a memory.

Step S4

Figure 6:
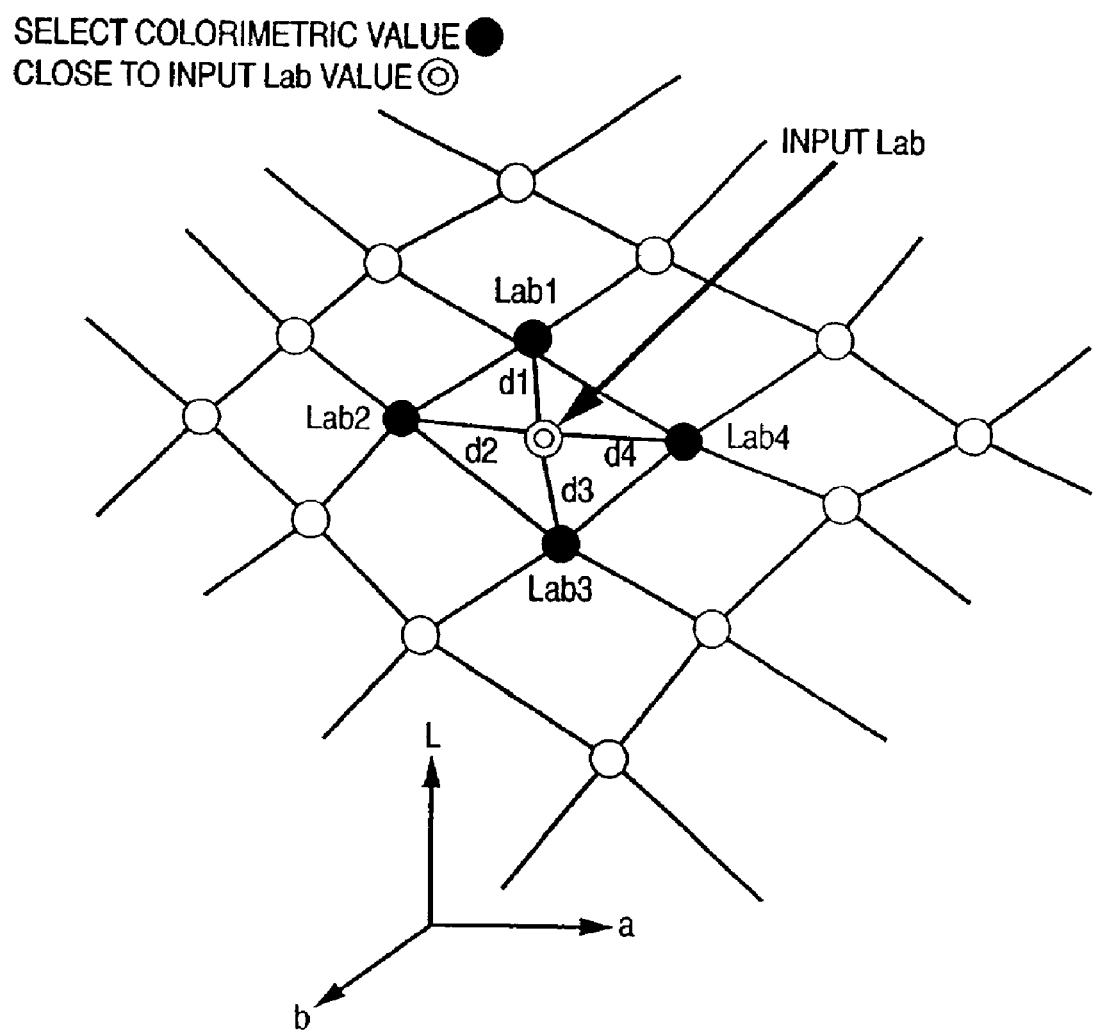
FIG. 6 is a view for explaining selection of sample points.

As shown in FIG. 6, N entries (●) in ascending order of distance d are selected for an input Lab value (○) At this time, the entries are described as follows in ascending order of distance d.

| RGB Value | Lab Colorimetric Value | Distance |
|---|---|---|
| $RGB_1$ | $Lab_1$ | $d_1$ |
| $RGB_2$ | $Lab_2$ | $d_2$ |
| $RGB_3$ | $Lab_3$ | $d_3$ |
| . | . | . |
| . | . | . |
| $RGB_N$ | $Lab_N$ | $d_N$ | for $d_1 < d_2 < d_3 < \ldots < d_N$

Step S5

A converted value (RGB value) corresponding to the input Lab value is computed by:

$RGB=(1/N) \times \Sigma_{i=1}^{N} RGB_i \times f(d_i)$ for $f(x)=1/(1+x^4)$

Figure 7:
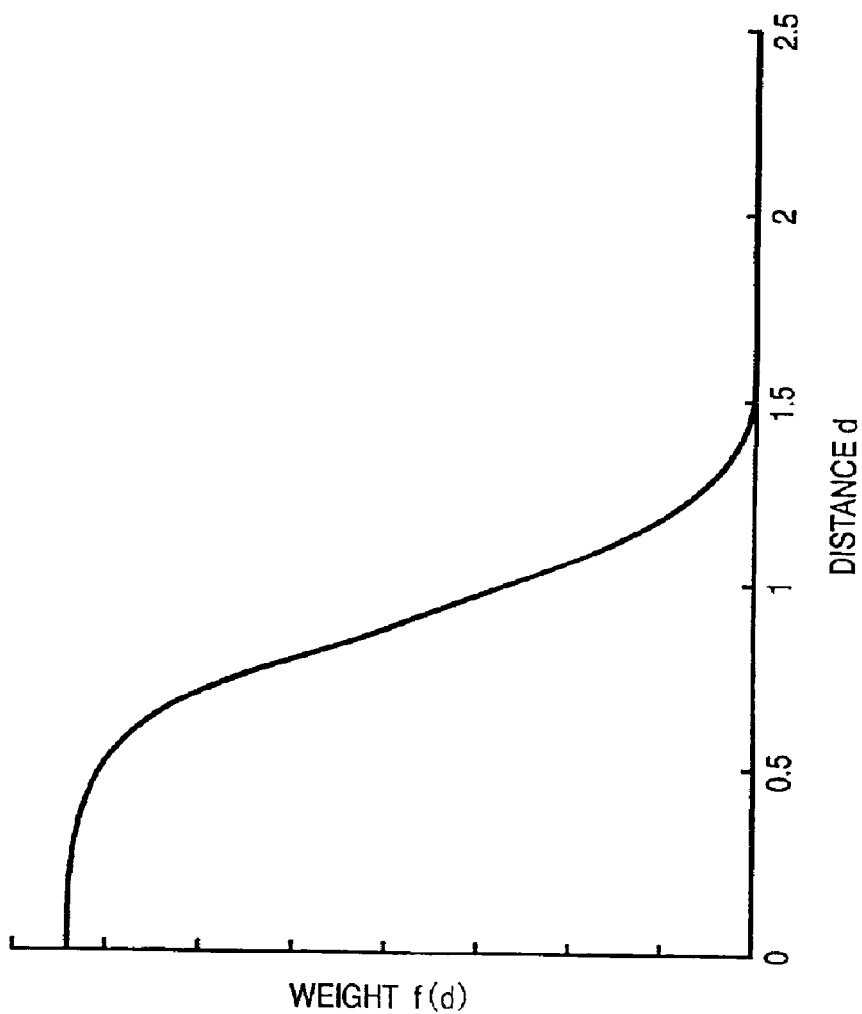
FIG. 7 is a graph for explaining a weighting function according to a distance d.

Since a function f(x) has characteristics shown in FIG. 7, the computation of the above equation is equivalent to an interpolation operation made on the Lab color space by multiplying an RGB value corresponding to a closer Lab colorimetric value by a larger weight.

The number N of sample points used in the interpolation operation can be set to be a constant (e.g., 8) in the entire Lab color space. However, since colorimetric values are concentrated on a region with a lower lightness value L*, as shown in FIG. 5, depending on the conversion scheme adopted in the device RGB to CMYK converter 106, a problem may be posed if N is set to be a constant. That is, since the distance d becomes very small in the region where the colorimetric values are concentrated, if N is small, an interpolation operation is made by multiplying a small number of sample points by a large weight, and problems such as tone jump in the RGB color space, abnormal white balance in a low-lightness region, and the like readily take place.

Figure 8:
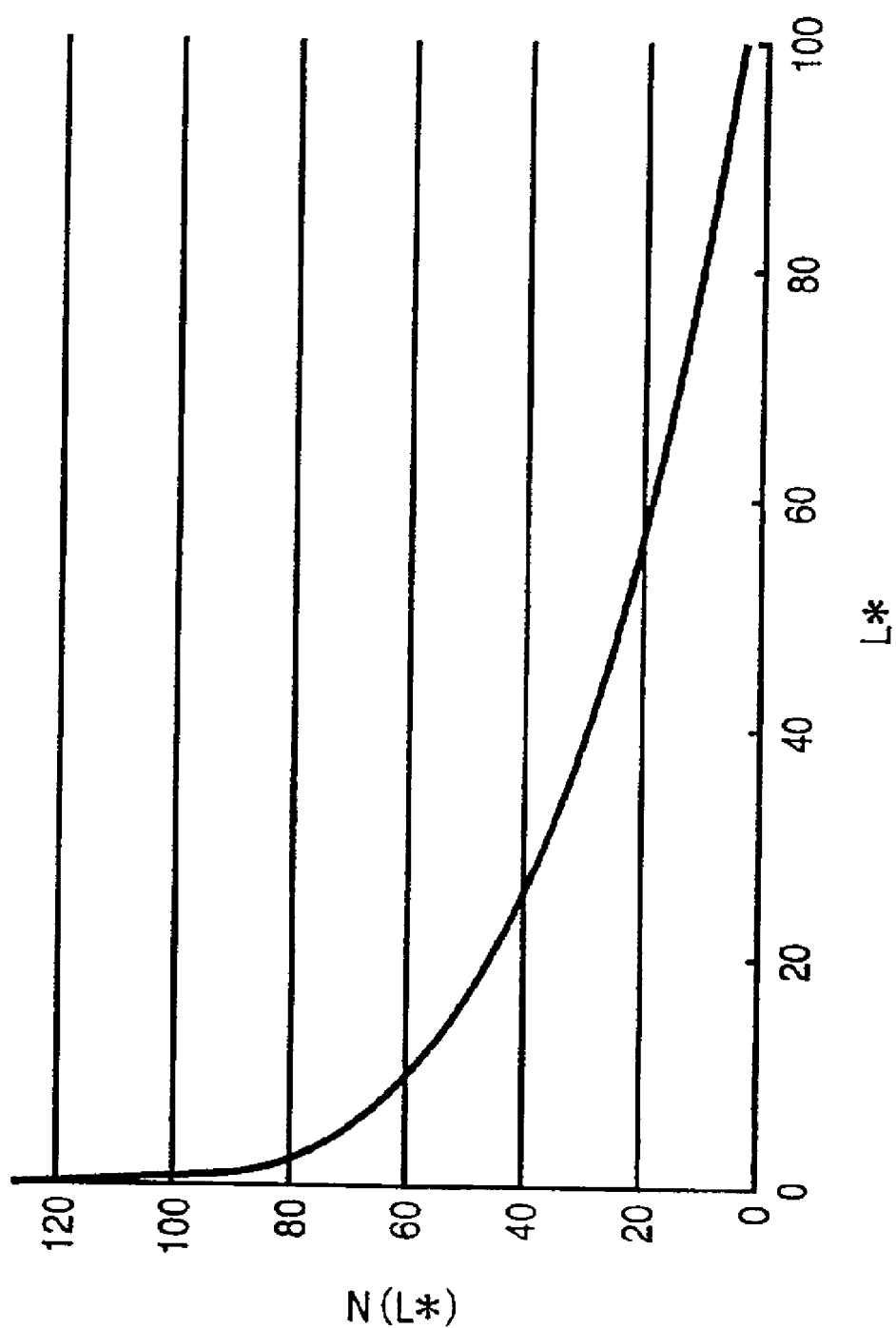
FIG. 8 is a graph for explaining a function for changing the number of sample points.

These problems can be effectively solved by interpolating while changing the number of sample points in correspondence with an L* value of the input Lab value, as shown in FIG. 8. Of course, even in a high-lightness region, the number of sample points used in the interpolation operation is limited and turbidity or the like is hard to occur. Note that the example of a function N(L*) shown in FIG. 8 indicates a (¼)-th power function that yields 128 when L*=0, and 4 when L*=100.

By repeating the processes in steps S3 to S5 for all input Lab values, an Lab signal can be converted into a device RGB signal.

Second Embodiment

An image processing apparatus according to the second embodiment of the present invention will be explained below. Note that the same reference numerals in this embodiment denote the same parts as in the first embodiment, and a detailed description thereof will be omitted.

Figure 9:
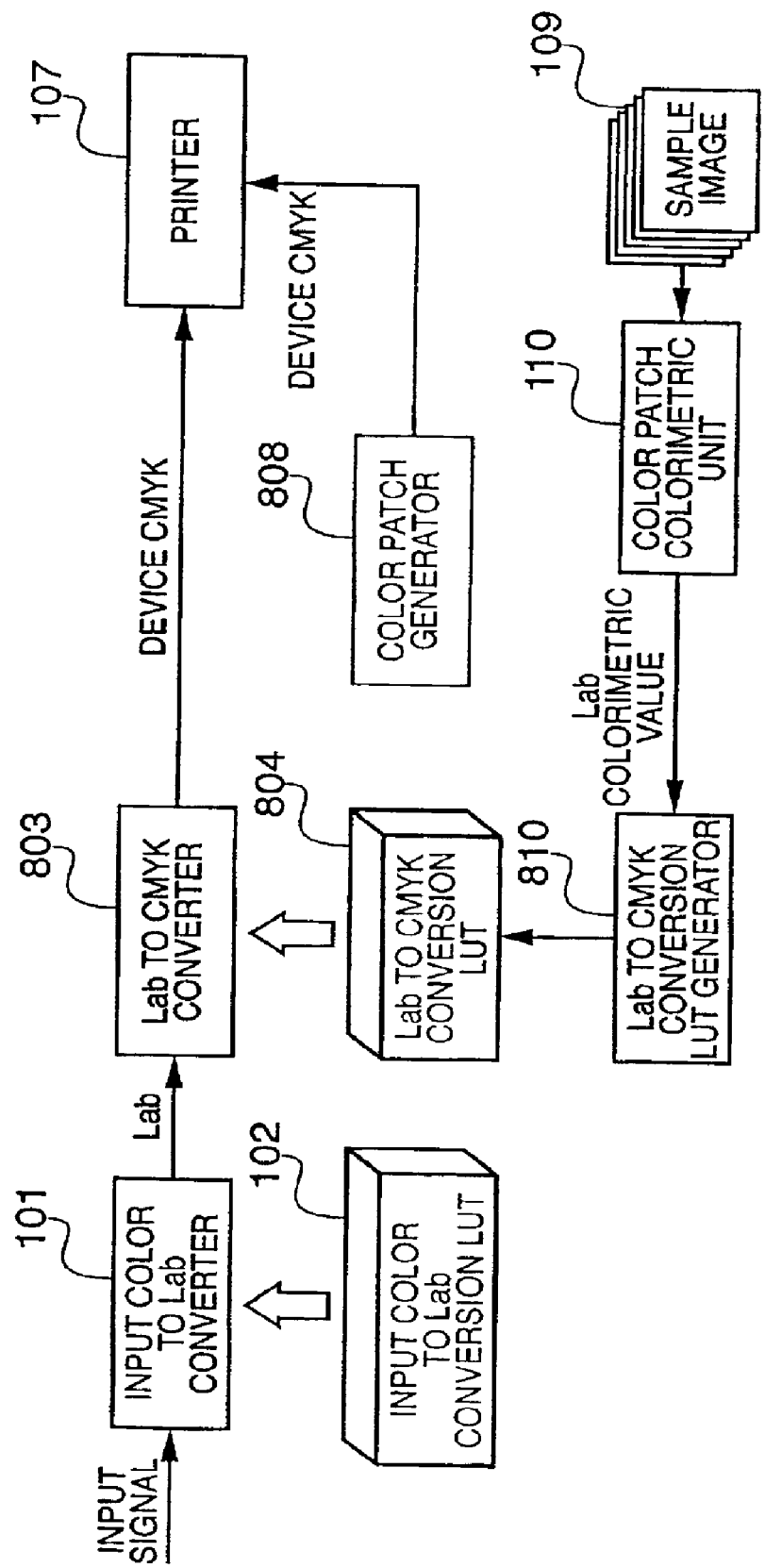
FIG. 9 is a block diagram showing the arrangement of an image processing apparatus of the second embodiment.

FIG. 9 is a block diagram showing the arrangement of the image processing apparatus of the second embodiment. The image processing apparatus of the second embodiment is different from that of the first embodiment in that a signal of a device-independent color space is converted into a signal of a color space of the printer 107 using an LUT in the same manner as in a case wherein an input signal is converted into a signal of a device-independent color space.

An Lab to CMYK converter 803 converts an Lab signal into a signal of a CMYK color space which depends on the printer 107 using an Lab to CMYK conversion LUT 804. The CMYK signal output from the Lab to CMYK converter 803 is sent to the printer 107. The Lab to CMYK conversion LUT 804 is prepared as follows.

An RGB signal of the sample image generated by the color patch generator 108 is converted into a CMYK signal that depends on the printer 107 by the device RGB to CMYK converter 106, and the CMYK signal is output to the printer 107, thus obtaining a sample image 109.

The color patch colorimetric unit 110 measures color patches of the obtained sample image 109 to obtain Lab colorimetric values of the color patches. An Lab to CMYK conversion LUT generator 810 generates a table of the Lab to CMYK conversion LUT 804 on the basis of the obtained Lab colorimetric values and RGB values generated by the color patch generator 108.

The process of the Lab to CMYK conversion LUT generator 810 generates a table of the Lab to CMYK conversion LUT 804 on the basis of CMYK values obtained by applying the device RGB to CMYK conversion process explained in the first embodiment to the RGB values generated by the color patch generator 108, and the Lab colorimetric values. For example, if an Lab value is an 8-bit signal, an L* value ranges from 0 to 255, and a* and b* values range from −128 to 127. When Lab grids are formed by segmenting the Lab ranges into 16 steps, a table of the CMYK to Lab conversion LUT 804 can be generated by 4913 (=$17^3$) calculations.

In the first embodiment, the Lab color space is converted into the device RGB color space using an LUT, and the device RGB color space is converted into the CMYK color space by an arithmetic process. In the second embodiment, these conversion processes can be done by a single LUT, thus achieving efficient conversion processes.

Third Embodiment

An image processing apparatus according to the third embodiment of the present invention will be described below. Note that the same reference numerals in this embodiment denote the same parts as in the first embodiment, and a detailed description thereof will be omitted.

Figure 10:
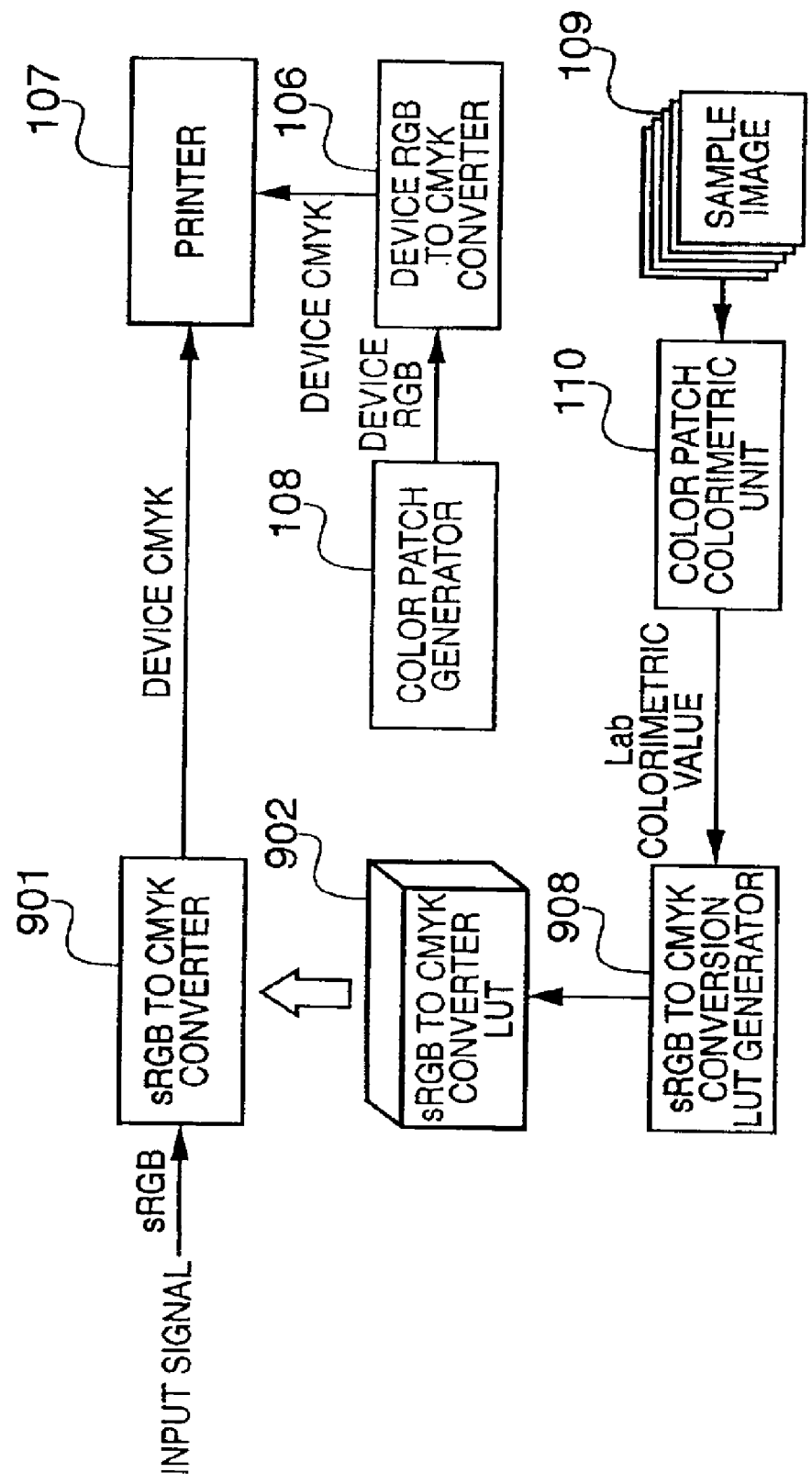
FIG. 10 is a block diagram showing the arrangement of an image processing apparatus of the third embodiment.

FIG. 10 is a block diagram showing the arrangement of the image processing apparatus of the third embodiment, which has an arrangement for inputting an input signal of an sRGB color space that becomes a standard color space in the Internet in recent years. The sRGB color space has specific correspondence with an XYZ color space, and can be considered as a device-independent color space. Hence, when an sRGB value is converted into an XYZ or Lab value, and then undergoes the aforementioned conversion from the Lab color space into a printer color space, the printer 107 can reproduce an image expressed by the signal of the sRGB color space.

Referring to FIG. 10, an sRGB to CMYK converter 901 converts an input signal of the sRGB color space into a signal of the CMYK color space that depends on the printer 107 using an sRGB to CMYK conversion LUT 902. The CMYK signal output from the sRGB to CMYK converter 901 is sent to the printer 107. The sRGB to CMYK conversion LUT 902 is generated as follows.

An RGB signal of a sample image generated by the color patch generator 108 is converted into a CMYK signal that depends on the printer 107 by the device RGB to CMYK converter 106, and the converted CMYK signal is output to the printer 107, thus obtaining a sample image 109.

The color patch colorimetric unit 110 measures respective color patches of the obtained sample image 109 to obtain Lab colorimetric values of the color patches. An sRGB to CMYK conversion LUT generator 908 generates a table of the sRGB to CMYK conversion LUT 902 on the basis of the obtained Lab colorimetric values and the RGB values generated by the color patch generator 108.

The process of the sRGB to CMYK conversion LUT generator 908 generates a table of the sRGB to CMYK conversion LUT 902 on the basis of CMYK values obtained by applying the device RGB to CMYK conversion process explained in the first embodiment to RGB values generated by the color patch generator 108, and sRGB values obtained by applying Lab to XYZ and XYZ to sRGB conversions according to definition equations to Lab colorimetric values. For example, if an sRGB signal is an 8-bit signal, when 17×17×17 sRGB grids are formed by segmenting respective sRGB ranges into 16 steps, a table of the sRGB to CMYK conversion LUT 902 can be generated by 4913 (=$17^3$) calculations.

According to the embodiments mentioned above, a color conversion method which can precisely approximate strong nonlinear output characteristics of a color printer and printing press and can realize high-precision color reproduction can be provided. Therefore, since color space conversion that satisfactorily reflects the characteristics of a printer and printing press is done in the device-independent color space, the printer and printing press can achieve high-precision color reproduction independently of the input color space.

In the above embodiment, the Lab color space has been exemplified as the device-independent color space.

However, other uniform color spaces, e.g., an Luv color space may be used to obtain the same effects.

Fourth Embodiment

In some cases, an image that has been color-converted in correspondence with the output characteristics of a printing press as a target for the purpose of proof (test print, calibration print) is printed by a copying machine or printer. To attain such proof, sample image data is supplied to an output device used in the proof to make that device print a sample image by the method explained in the above embodiments, and a profile must be generated based on colorimetric values of color patches of the obtained sample image. An image that has undergone color conversion using the generated profile is printed by the output device.

A process for generating a profile of an output device used in proof and a colorimetric process in this case will be explained below as the fourth embodiment. Note that the profile generated by the method explained in the fourth embodiment is not limited to that for proof, and can be used in a normal output (print) process.

[Arrangement of Color Conversion Module]

Figure 11:
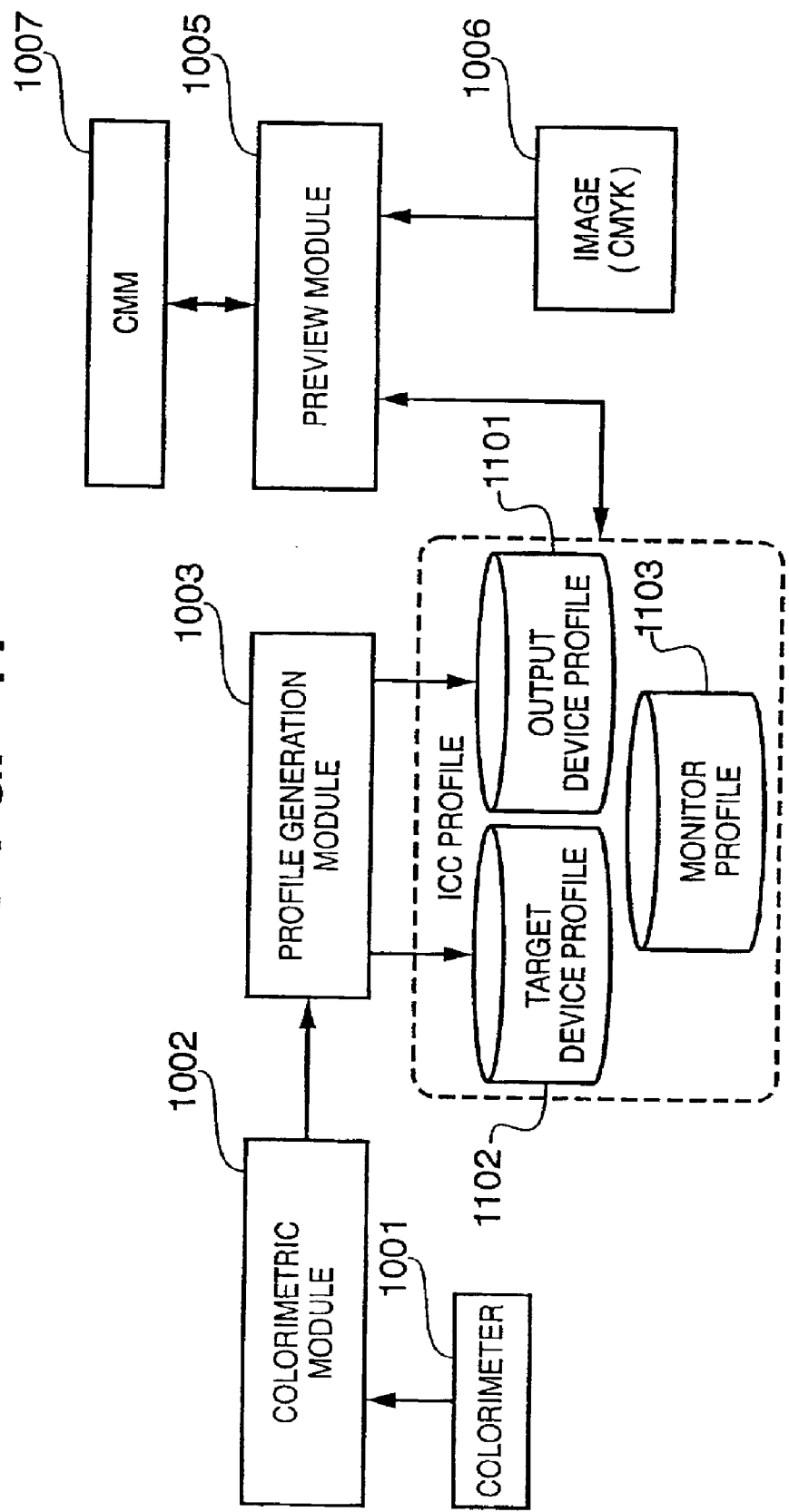
FIG. 11 is a block diagram showing the arrangement of a color conversion module of the fourth embodiment.

An outline of an arrangement for making color conversion will be explained first. FIG. 11 is a block diagram showing the arrangement of a color conversion module.

A calorimeter (spectrophotometer) 1001 and colorimetric module 1002 measure color patches of a sample image (e.g., a standard IT8 or 4320 CMYK image) printed by an output device. The colorimetric result is supplied to a profile generation module 1003 on-line or off-line, which generates a profile 1101D (Lab to CMYK conversion LUT: BtoA0) and profile 1101S (device value to Lab conversion LUT: AtoB0) as output device profiles according to the definitions of ICC (International Color Consortium) by the method explained in the above embodiments.

A preview module 1005 supplies (or instructs) an image 1006 to be proofed, a profile (target device value to Lab conversion LUT) 1102 corresponding to a target device, the profiles 1101D and 1101S of the output device, and a monitor profile 1103 to a color management module (CMM) 1007 to make it color-convert the image 1006.

[Generation of Profile]

Figure 12:
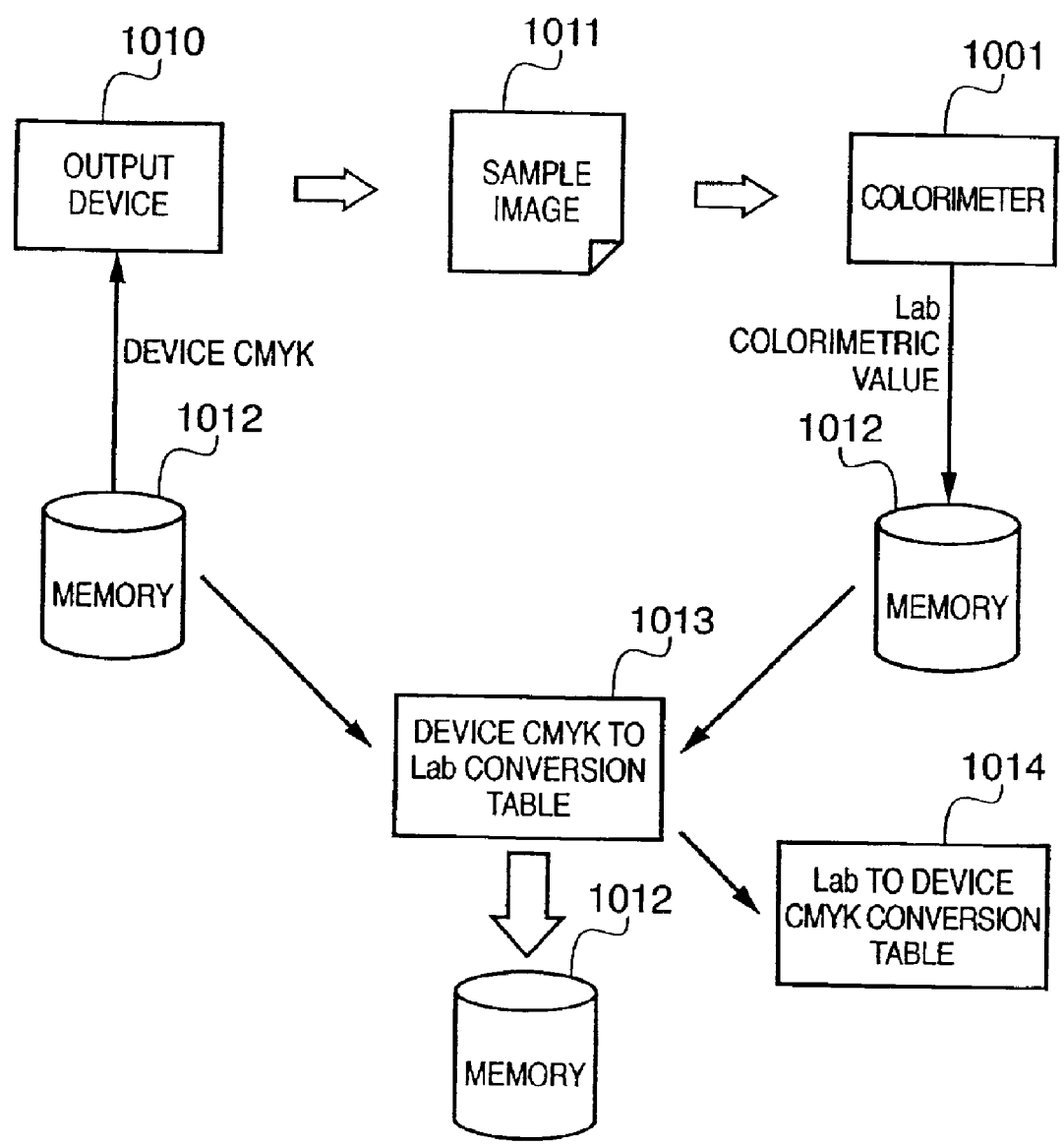
FIG. 12 is diagram for explaining a profile generation sequence of an output device.

Generation of the profiles of the output device will be described in detail below. FIG. 12 is a diagram for explaining the generation sequence of the profile of the output device, i.e., the process explained in the second embodiment more briefly.

Device CMYK data of a sample image selected by the user from a memory 1012 is supplied to an output device 1010, thus printing a sample image 1011. As the sample image, a standard IT8 or 4320 CMYK image or the like is used.

The colorimeter 1001 and colorimetric module 1002 measure color patches of the sample image 1011 printed by the output device 1010, and Lab colorimetric values are stored in the memory 1012. The profile generation module 1003 generates a device CMYK to Lab conversion table 1013 corresponding to an AtoB0 tag of an ICC profile, and stores it in the memory 1012.

Since a BtoA0 tag is required in addition to the AtoB0 tag in consideration of a preview function, the profile generation module 1003 generates an Lab to device CMYK conversion table 1014 on the basis of the device CMYK to Lab conversion table 1013. Note that these conversion tables are finally stored in the memory 1012 as the ICC profiles of the output device 1010.

Device CMYK values in the device CMYK to Lab conversion table 1013 are equally spaced apart, but Lab colorimetric values are not. When the Lab to device CMYK conversion table 1014 that inputs Lab values is generated, Lab values must be equally spaced apart. Hence, the Lab to device CMYK conversion table 1014 in which Lab values are equally spaced apart is generated based on the device CMYK to Lab conversion table 1013 using the method explained in the first embodiment, and is stored in the memory 1012.

Figure 13:
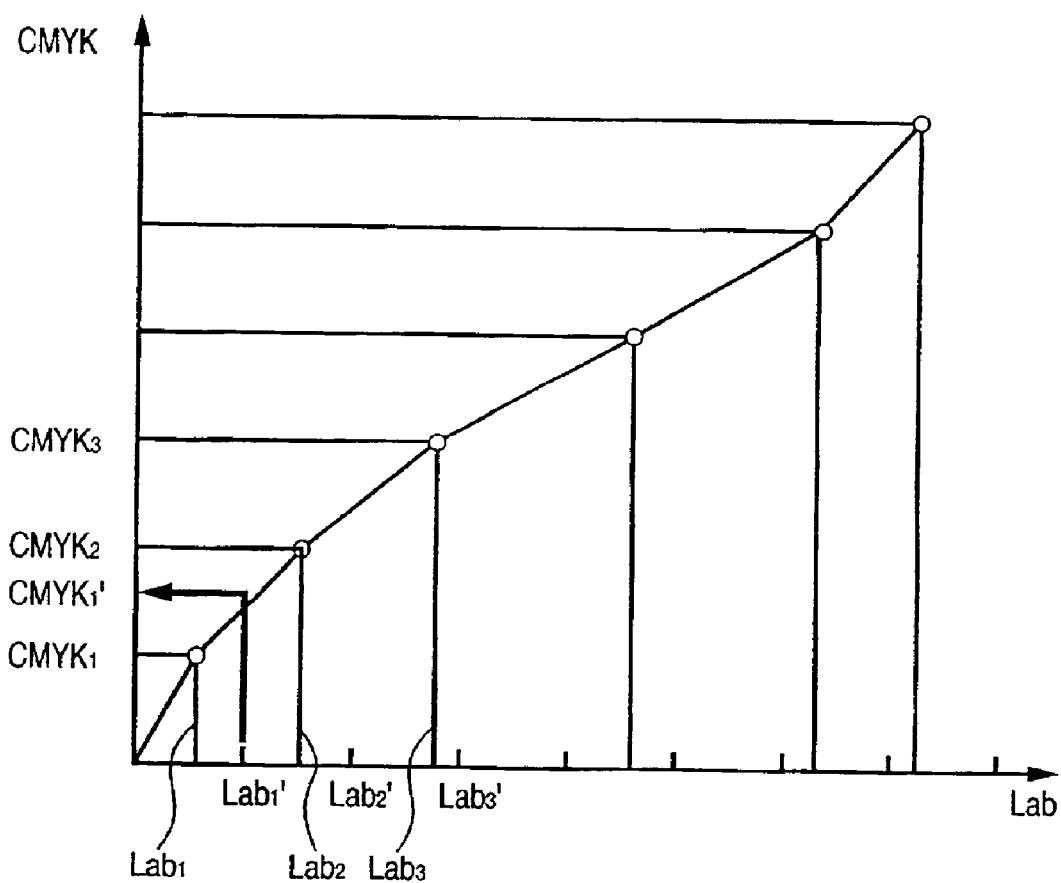
FIG. 13 is a graph for explaining generation of an Lab to device CMYK conversion table.

FIG. 13 is a graph for explaining generation of the Lab to device CMYK conversion table 1014. Table input values ($Lab_1'$, $Lab_2'$, $Lab_3'$, ...) in the Lab to device CMYK conversion table 1014, and table input values ($CMYK_1$, $CMYK_2$, $CMYK_3$, ...) in the device CMYK to Lab conversion table 1013 have equal intervals. However, Lab measurement values ($Lab_1$, $Lab_2$, $Lab_3$ ...) in the device CMYK to Lab conversion table 1013 do not always have equal intervals.

Hence, the table input value $Lab_i'$ is interpolated using its neighboring Lab measurement values. For example, $Lab_1'$ in FIG. 13 is interpolated by:

$$Lab_1'=a/(a+b)\times(CMYK_2-CMYK_1)+CMYK_1$$

$$=b/(a+b)\times CMYK_1+a/(a+b)\times CMYK_2$$

for $a=Lab_1'-Lab_1$ $b=Lab_2-Lab_1'$

[Colorimetric Process]

The color conversion module shown in FIG. 11 is supplied to, e.g., a personal computer or the like as software, and is implemented. The operator can instruct execution of the colorimetric process via a user interface displayed on the monitor 1004.

Figure 14:
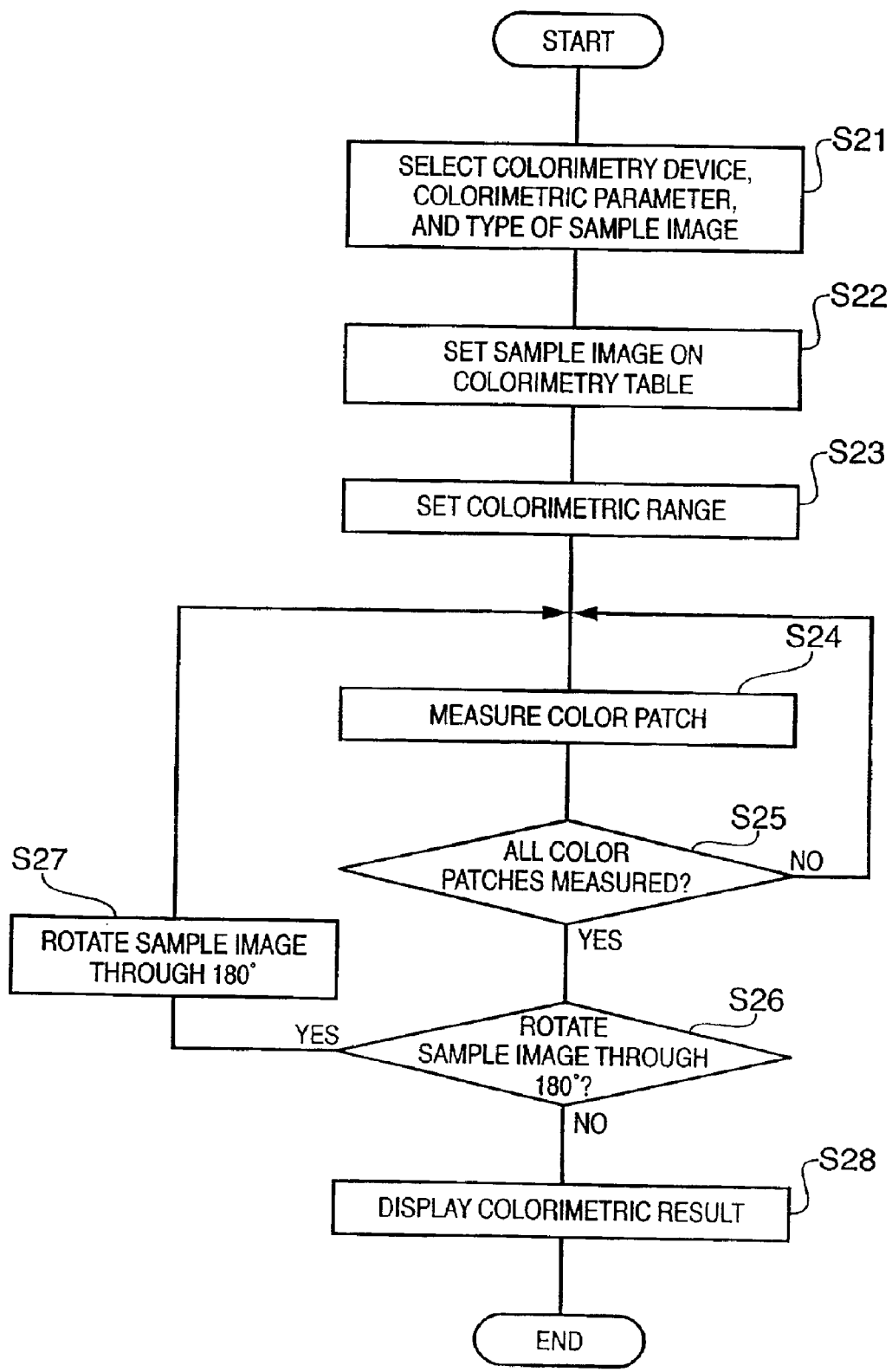
FIG. 14 is a flow chart showing the colorimetric sequence.

FIG. 14 is a flow chart showing the colorimetric sequence, which is executed by the profile generation module 1003. When the operator instructs start of colorimetry, a window shown in FIG. 15 is displayed, and the operator selects a colorimetry device, colorimetric parameters (colorimetric light source, colorimetric field, and color space), and the type of sample image (color chart) from popup menus in step S21.

Figure 15:
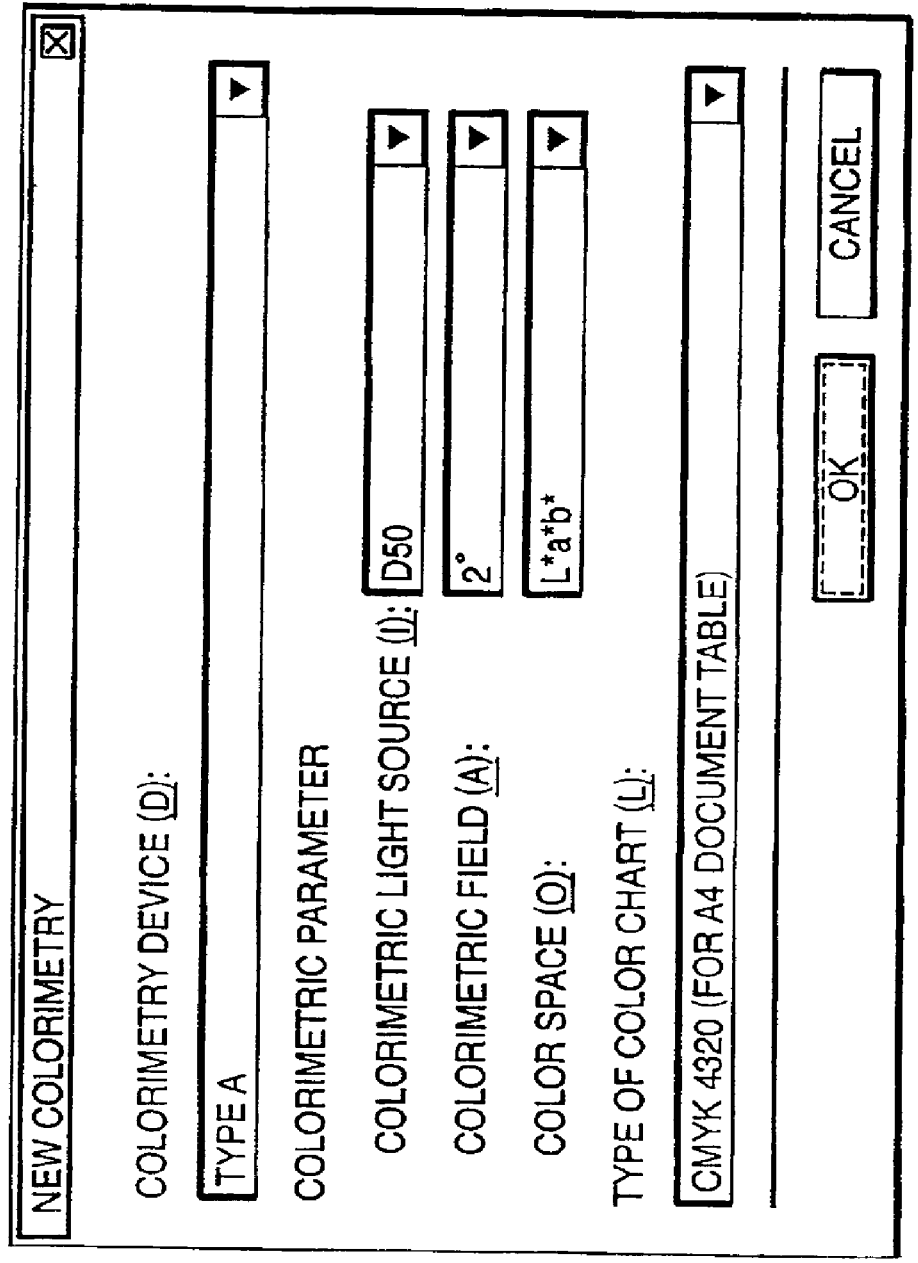
FIGS. 15 to 19 show user interfaces in a colorimetric process.
Figure 16:
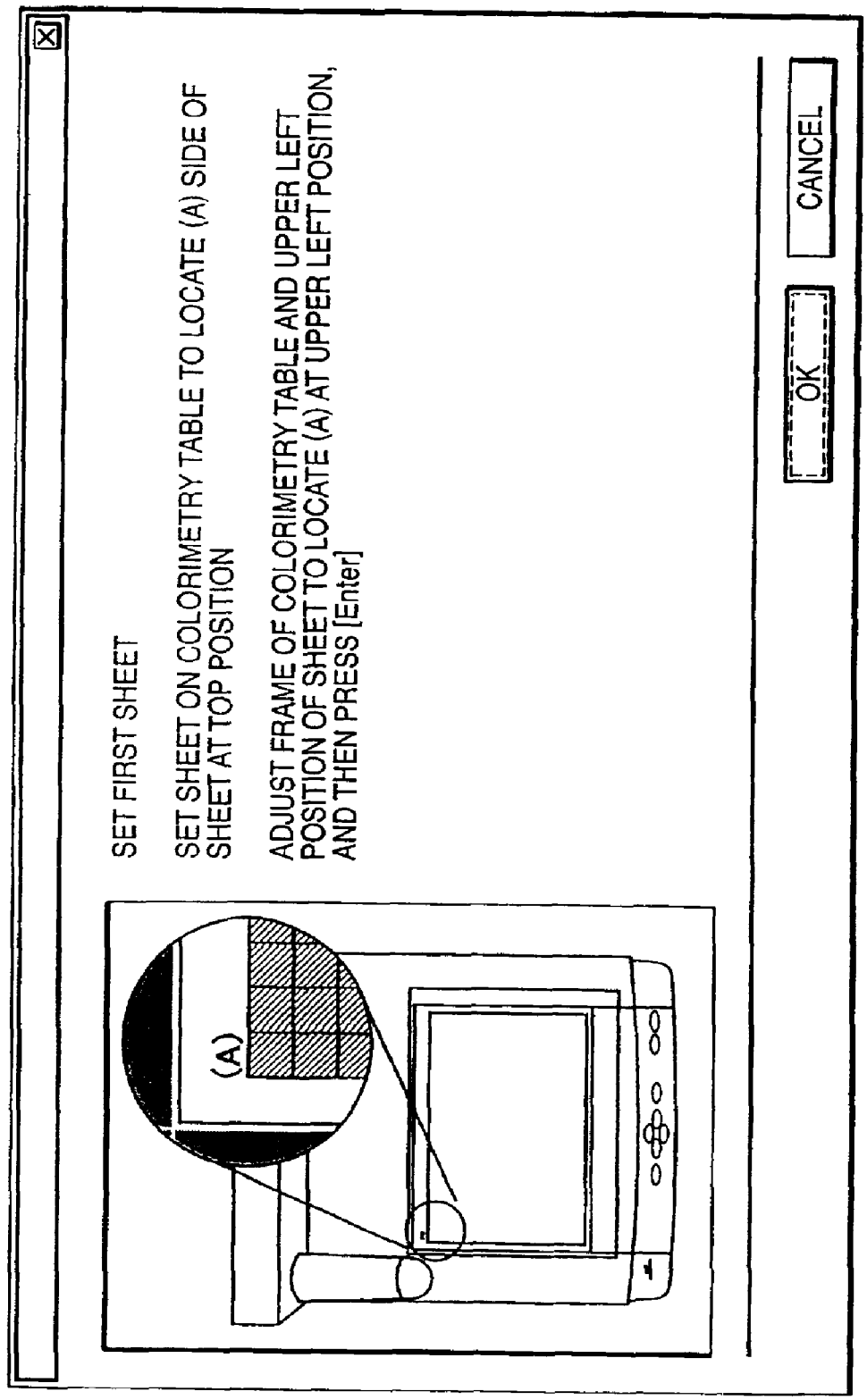

When the operator has pressed an [OK] button on the window shown in FIG. 15, a window shown in, e.g., FIG. 16 is displayed, and the operator sets a sample image output by the output device on a colorimetric table according to an instruction in step S22.

Figure 17:
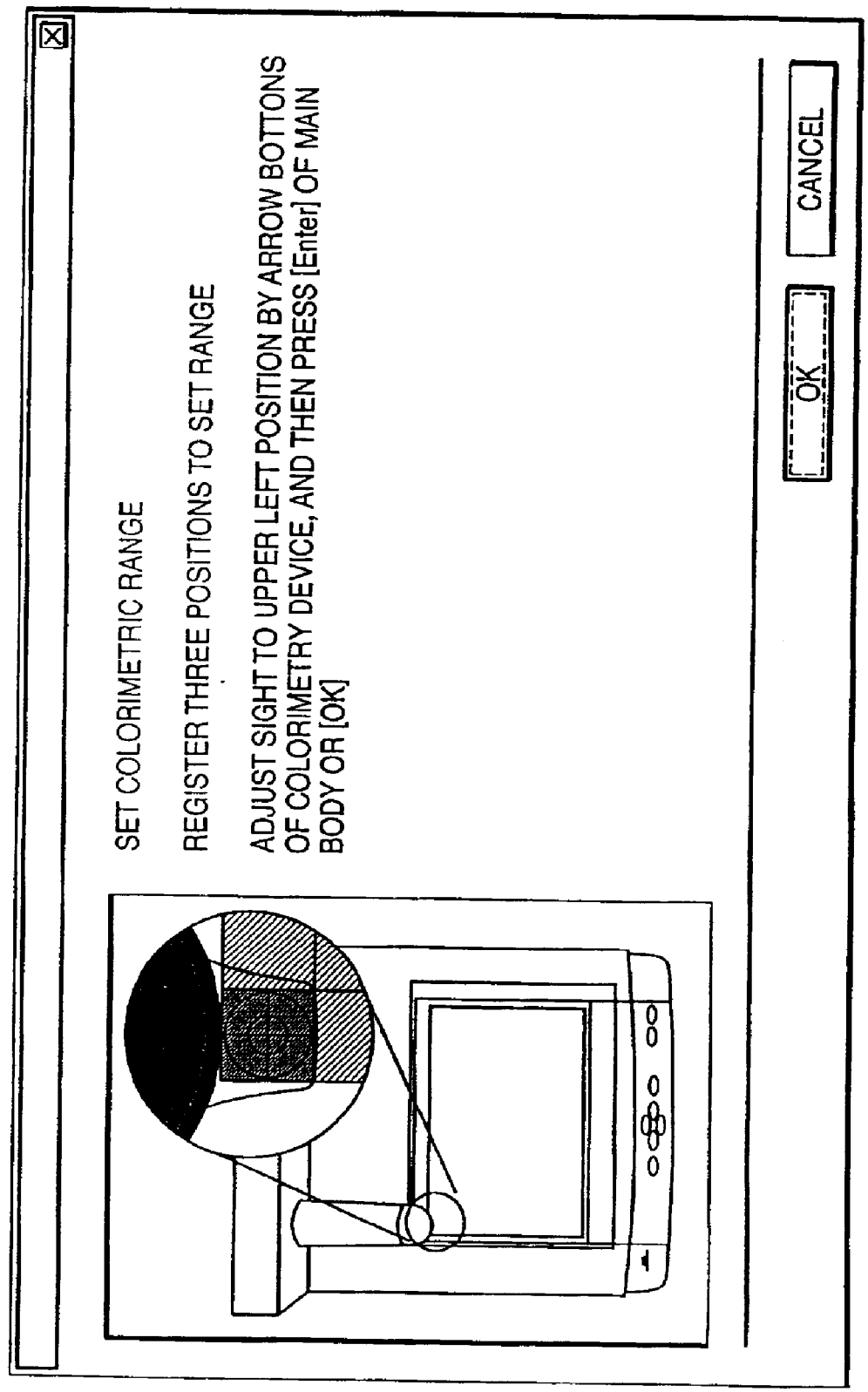
Figure 18:
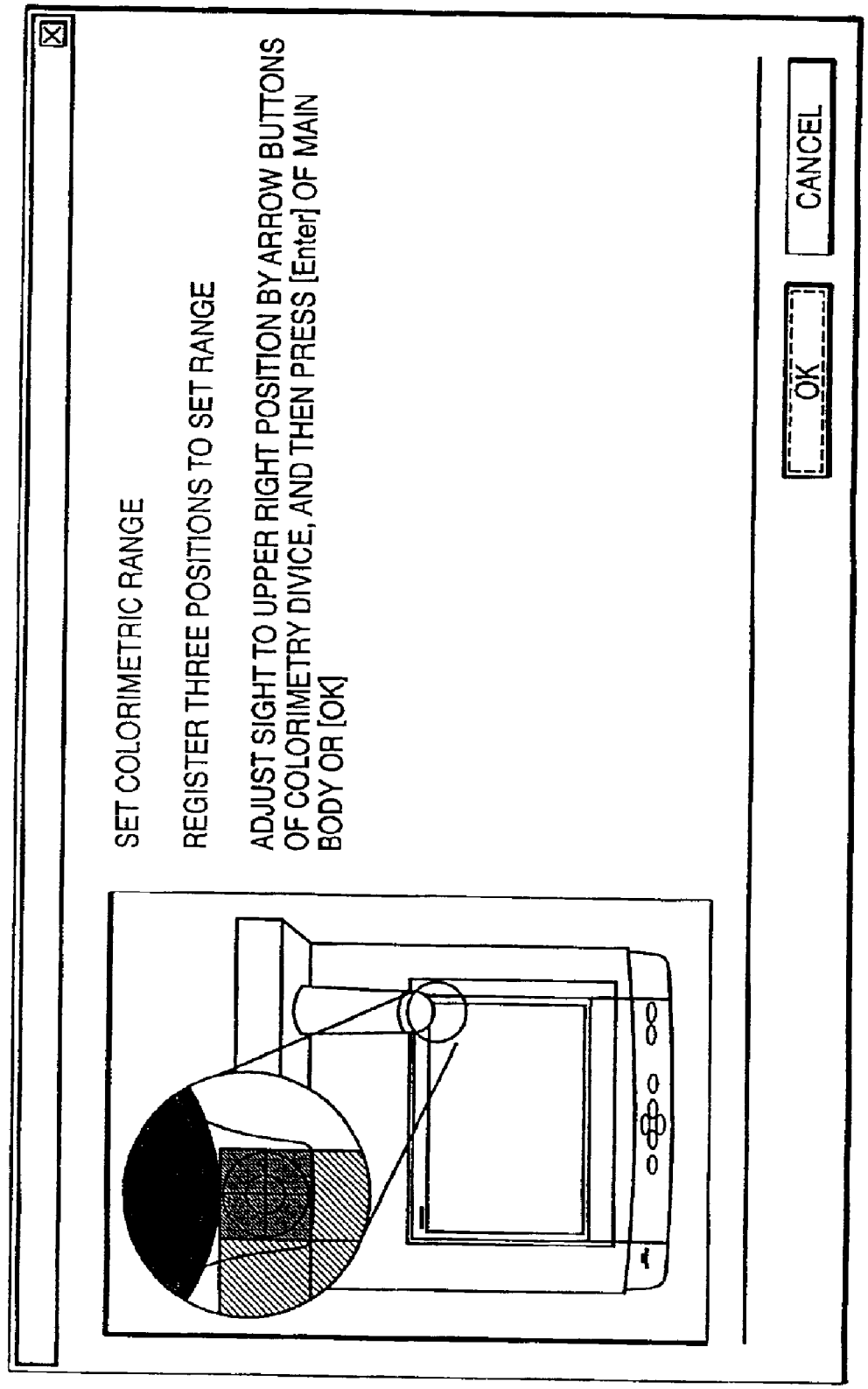
Figure 19:
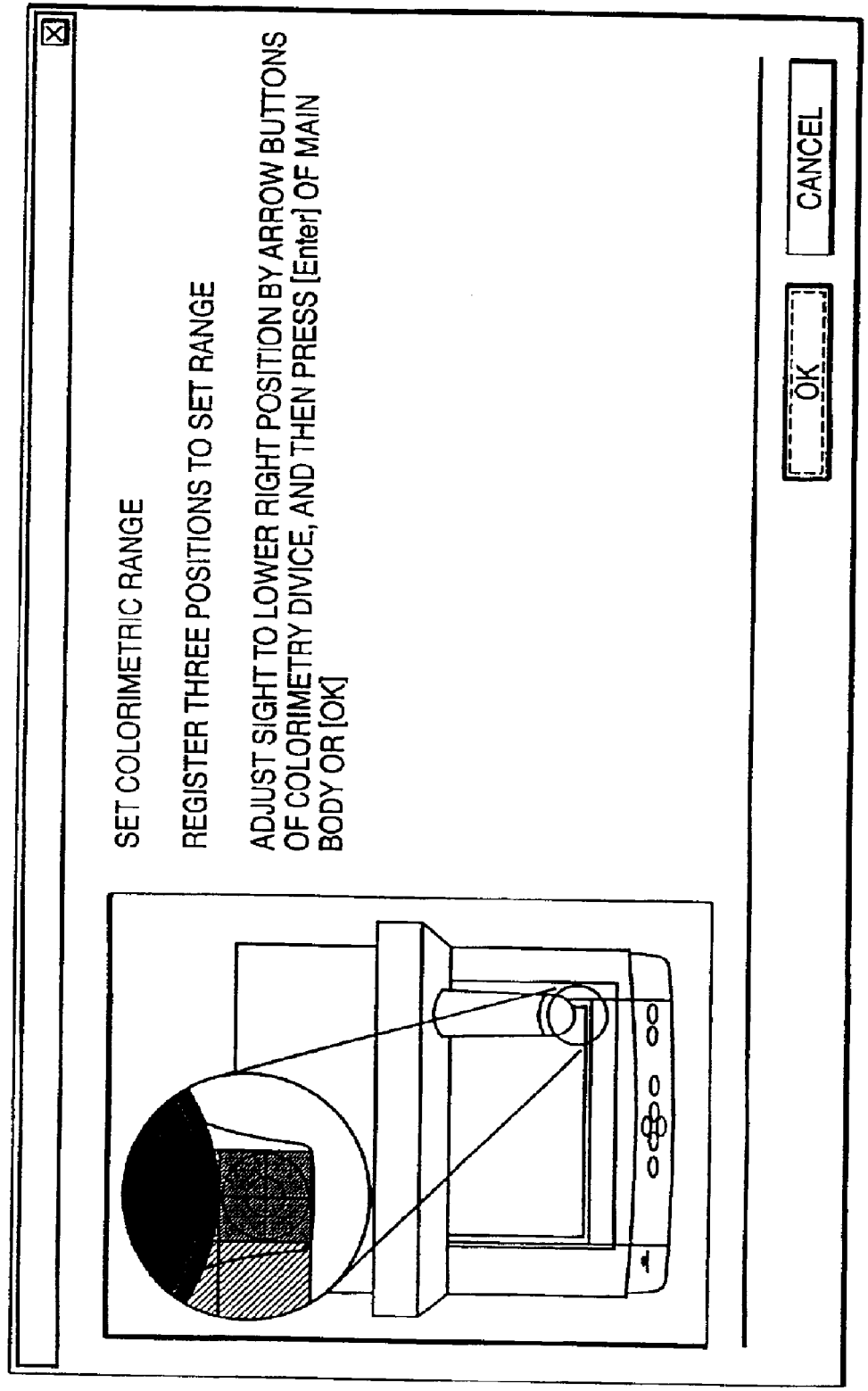

When the operator has pressed an [OK] button on the window shown in FIG. 16, a window shown in, e.g., FIG. 17 is displayed, and the operator sets the upper left position of a colorimetric range of the sample image according to an instruction in step S23. Subsequently, windows shown in, e.g., FIGS. 18 and 19 are displayed in turn, and the operator sets the upper right and lower right positions of the colorimetric range of the sample image according to an instruction.

Upon completion of the above operations, the colorimeter 1001 and colorimetric module 1002 measure color patches of the sample image in step S24. The process in step S24 repeats itself until it is determined in step S25 that all color patches of the sample image have been measured.

Figure 20:
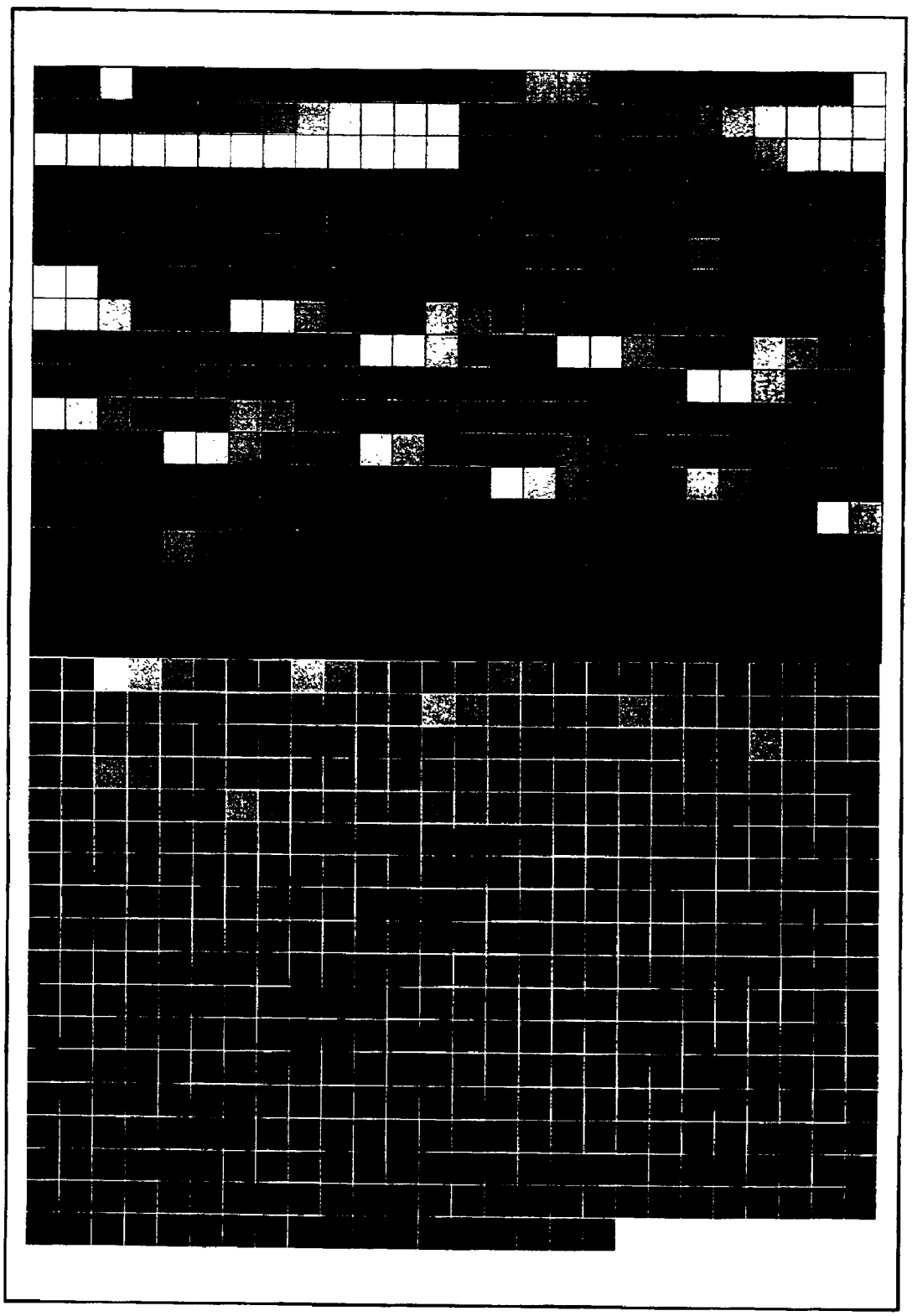
FIGS. 20 and 21 show an example of an IT8 image.

FIG. 20 shows an example of an IT8 image, which is prepared by printing 928 color patches on an A3-size recording paper sheet.

Upon reading an A3-size sample image shown in FIG. 20, a calorimeter that can read A3 size can be used but such A3-size calorimeter is expensive. Hence, the A3-size recording paper sheet is cut into two A4-size sample images as halves of A3 size, and these two images are measured by the calorimeter 1001 that can measure A4 size. Note that a sample image may be divisionally printed on two A4-size sheets, but the sample image is preferably printed on a large-size recording paper sheet such as an A3-size sheet since its characteristics can be reflected more accurately.

Figure 21:
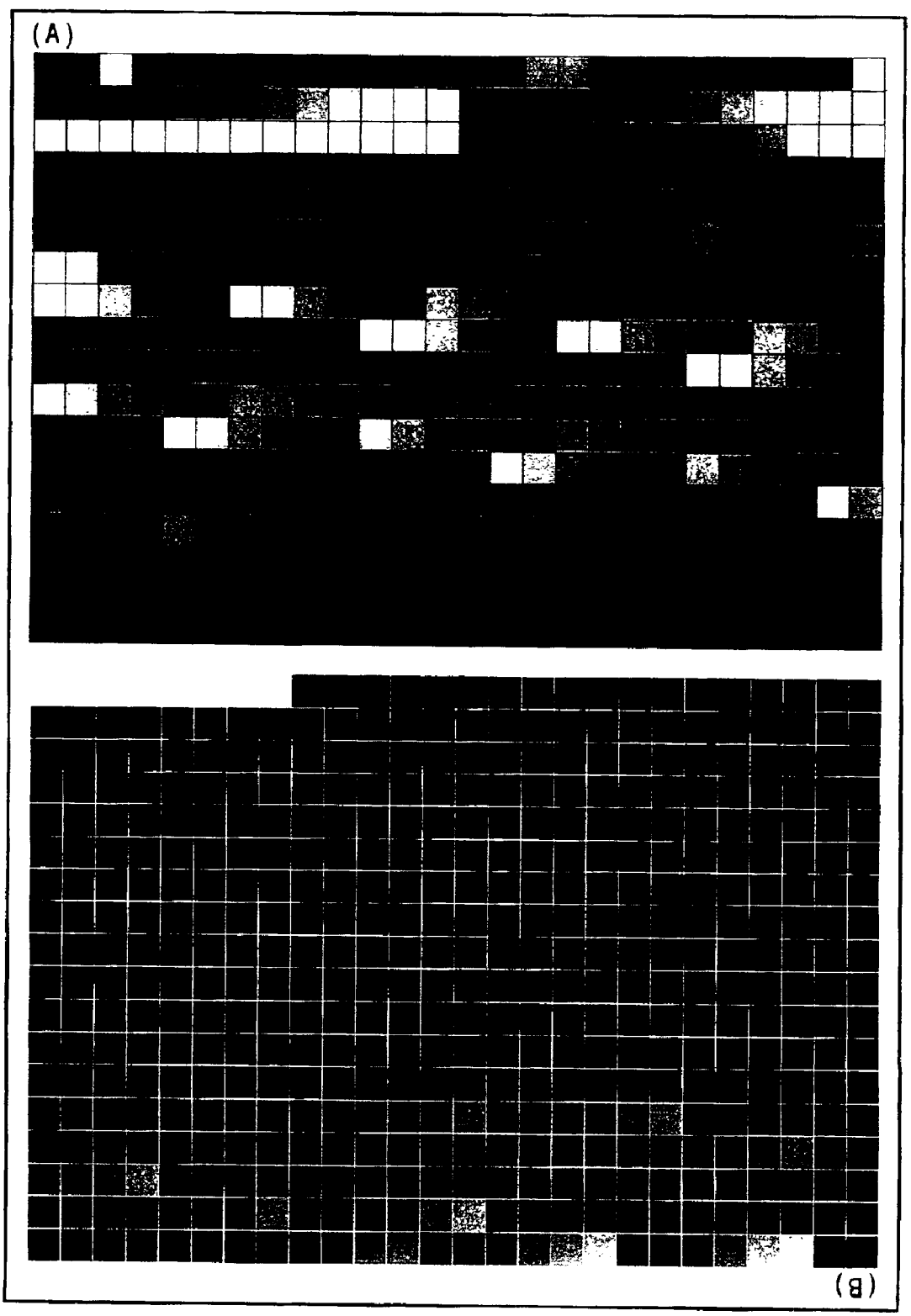

However, it is not efficient to cut the A3-size sample image into halves. Hence, as shown in FIG. 21, nearly half the color patches are printed on an A3-size recording paper sheet to have (A) in FIG. 21 as the top, and the remaining color patches are recorded on that sheet to have (B) shown in FIG. 21 as the top. In this way, after the color patches on the (A) side are measured, the sample image is rotated through 180° and set on the colorimeter 1001 to measure the color patches on the (B) side.

Figure 22:
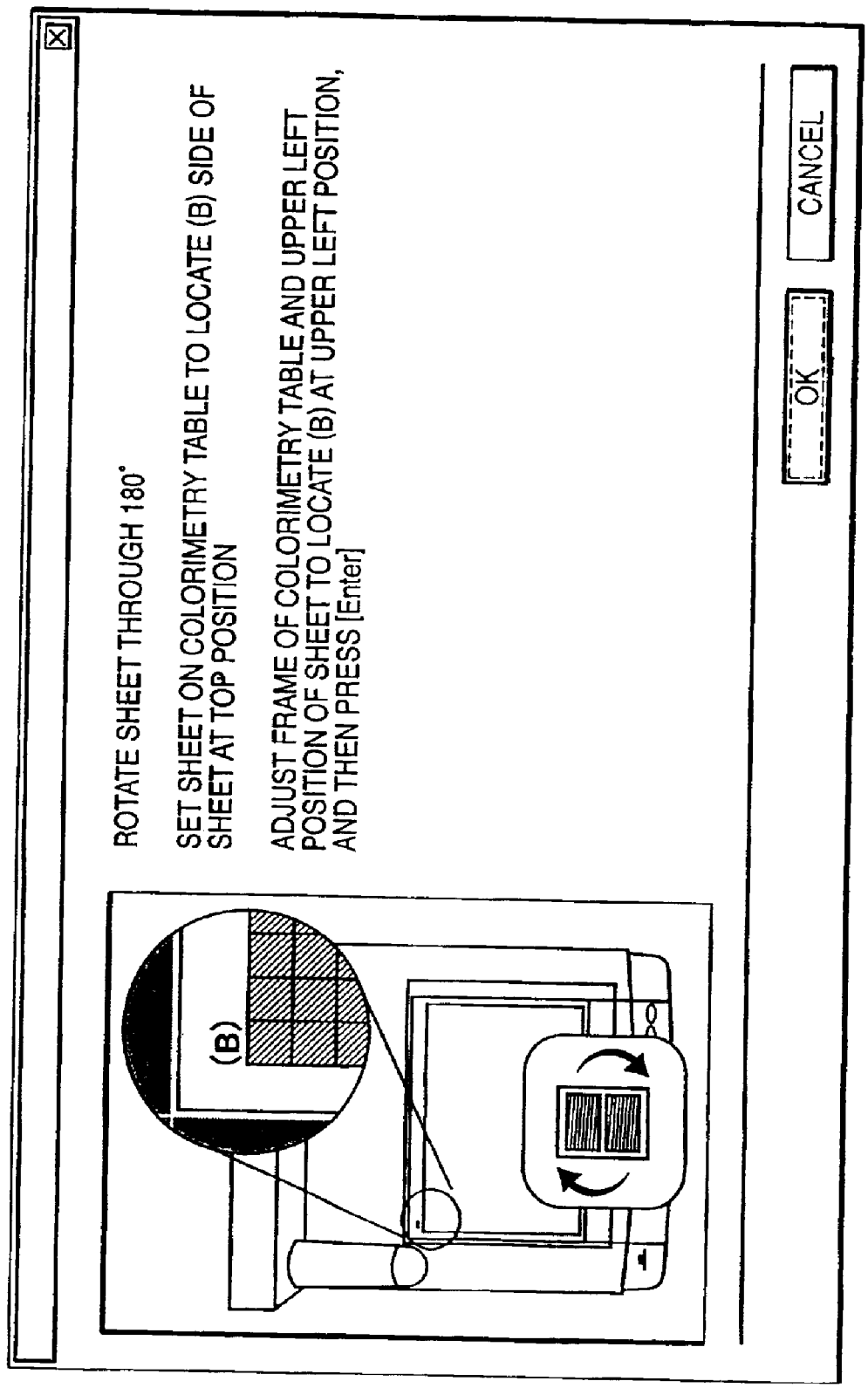
FIG. 22 shows a user interface in a colorimetric process.

That is, if it is determined in step S25 that all color patches have been measured, it is checked in step S26 if the sample image is to be rotated through 180°. If YES in step S26, a window shown in FIG. 22 is displayed, and the operator rotates the sample image through 180° and sets it on the colorimetry table in accordance with an instruction in step S27.

Upon completion of colorimetry of the color patches on the (A) and (B) sides of the sample image, the colorimetric result is color-displayed in step S28.

In this fashion, the A3-size sample image can be read by the calorimeter 1001 which can read up to A4 size without cutting the A3-size sample image into halves. Hence, the sample image can be efficiently read, and can be saved easily.

Figure 23:
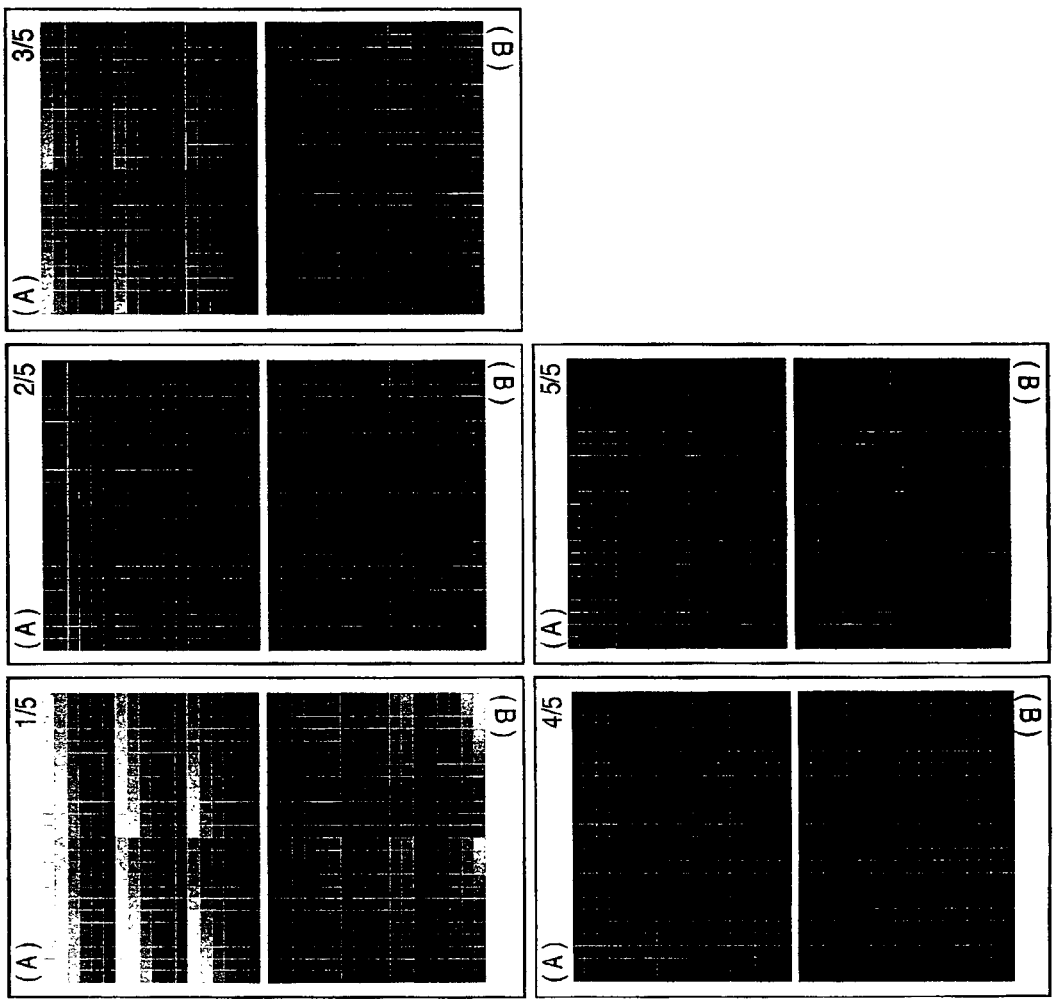
FIG. 23 shows an example of a 4320 CMYK image.

Note that the read process of the IT8 sample image has been exemplified. However, since 4320 CMYK images are printed on five A3-size recording paper sheets, the arrays of color patches of respective sample images are rotated through 180° in the same manner as in IT8, as shown in FIG. 23. Hence, upon reading 4320 CMYK images, it is checked in step S26 if the sample image is to be rotated through 180° or exchanged, and the sample image is rotated through 180° or exchanged in step S27. Note that ⅕ to ⅘ printed on the upper right positions of the respective sample images shown in FIG. 23 indicate the number and order of sample images.

In the above example, the A4-size sample image is read in A4 size. Also, the scope of this embodiment includes a process for reading a B4-size sample image in B5 size, and a process for reading an A2-size sample image in A3 size.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising the steps of:
    sending color patch data to an output device to control the output device to record color patches, wherein when the output device can record color patches on a recording paper sheet of a size not less than twice a recording paper sheet size that a colorimetry device can measure, the output device records two color patch groups each having the recording paper sheet size that the colorimetry device can measure;
    controlling the colorimetry device to read the two color patch groups; and
    generating a profile of the output device on the basis of colorimetric results of the two color patch groups,
    wherein read start positions of the two color patch groups are symmetrically arranged about a given point.

2. The method according to claim 1, further comprising the step of instructing, when the colorimetry device reads the two color patch groups and a read process of the first color patch group is complete, a user to rotate through 180° the recording paper sheet on which the two color patch groups are recorded.

3. A control method of an image processing apparatus which generates a plurality of conversion tables, which are used to convert an image between a color space depending on an output device and a color space independent of a device, on the basis of a read result of an output image of the output device, comprising the step of instructing to rotate the output image through 180° while reading the output image.

4. The method according to claim 3, wherein two color patch groups which are arranged in opposite directions are printed on the output image.

5. The method according to claim 4, wherein the output image has A3 size, and the two color patch groups are respectively printed as A4-size images.

6. The method according to claim 3, wherein the instruction for rotating the output image through 180° is issued after one of the two color patch groups is read and before a read process of the other color patch group starts.

7. An image processing apparatus for reading an output image of an output device to generate a plurality of conversion tables which are used to convert an image between a color space depending on the output device and a color space independent of a device, comprising:
    a colorimetric unit, arranged to measure color patches;
    a carrier, arranged to move said colorimetric unit to a position above the color patches arranged on the output image; and
    a controller, arranged to control operations of said colorimetric unit and said carrier,
    wherein said controller instructs to rotate the output image through 180° while reading the output image.

8. The apparatus according to claim 7, wherein two color patch groups which are arranged in opposite directions are printed on the output image.

9. The apparatus according to claim 8, wherein the output image has A3 size, and the two color patch groups are respectively printed as A4-size images.

10. The apparatus according to claim 7, wherein said controller instructs to rotate the output image through 180° after one of the two color patch groups is read and before a read process of the other color patch group starts.

11. A computer program product comprising a computer readable medium storing a computer program code, for an image processing method, comprising process procedure code for:
    sending color patch data to an output device to control the output device to record color patches, wherein when the output device can record color patches on a recording paper sheet of a size not less than twice a recording paper sheet size that a colorimetry device can measure, the output device records two color patch groups each having the recording paper sheet size that the colorimetry device can measure;
    controlling the colorimetry device to read the two color patch groups; and
    generating a profile of the output device on the basis of colorimetric results of the two color patch groups,
    wherein read start positions of the two color patch groups are symmetrically arranged about a given point.

12. A computer program product comprising a computer readable medium storing a computer program code, for a control method of an image processing apparatus for generating a plurality of conversion tables which are used to convert an image between a color space depending on an output device and a color space independent of a device on the basis of a read result of an output image of the output device, comprising process procedure code for instructing to rotate the output image through 180° while reading the output image.

* * * * *

UNITED STATES PATENT AND TRADEMARK OFFICE
CERTIFICATE OF CORRECTION

PATENT NO. : 6,919,972 B2  
APPLICATION NO. : 09/950867  
DATED : July 19, 2005  
INVENTOR(S) : Kumada et al.

It is certified that error appears in the above-identified patent and that said Letters Patent is hereby corrected as shown below:

Title page,  
Item [57], ABSTRACT,  
Lines 2, 5 and 11, "calorimeter" should read -- colorimeter --.

Drawings,  
Sheets 18 and 19, Figs. 18 and 19, respectively, "DIVICE," should read -- DEVICE, --.

Column 1,  
Line 36, "calorimeter" should read -- colorimeter --.

Column 4,  
Line 27, "an equal interval." should read -- equal intervals. --.

Column 5,  
Line 16, "turbidity or the like is hard" should read -- it is hard for turbidity or the like --.

Column 7,  
Line 23, "calorimeter" should read -- colorimeter --.

Column 8,  
Lines 57, 58 and 61, "calorimeter" should read -- colorimeter --.

Column 9,  
Line 18, "calorimeter" should read -- colorimeter --.

Signed and Sealed this

Twentieth Day of June, 2006

JON W. DUDAS  
*Director of the United States Patent and Trademark Office*